(12) United States Patent
Rothchild

(10) Patent No.: US 6,350,969 B1
(45) Date of Patent: Feb. 26, 2002

(54) SELF-REGULATING HEATER

(75) Inventor: Ronald D. Rothchild, Huntington Station, NY (US)

(73) Assignee: Jona Group, Ltd., Farmingdale, NY (US)

( * ) Notice: Subject to any disclaimer, the term of this patent is extended or adjusted under 35 U.S.C. 154(b) by 0 days.

(21) Appl. No.: 09/930,567

(22) Filed: Aug. 15, 2001

Related U.S. Application Data

(60) Provisional application No. 60/247,293, filed on Nov. 10, 2000.

(51) Int. Cl.$^7$ ................................................. H05B 1/02
(52) U.S. Cl. ................................................... 219/505
(58) Field of Search ................................. 219/505, 540, 219/544, 548, 553; 361/24

(56) References Cited

U.S. PATENT DOCUMENTS

| | | |
|---|---|---|
| 3,573,021 A | 3/1971 | Smith |
| 3,794,551 A | 2/1974 | Landingham |
| 3,978,914 A | 9/1976 | Phillips |
| 4,040,603 A | 8/1977 | Mainlero |
| 4,059,712 A | 11/1977 | Bothwell |
| 4,104,509 A | 8/1978 | Bokestal et al. |
| 4,109,031 A | 8/1978 | Marscher |
| 4,121,093 A | 10/1978 | Wainwright |
| 4,142,022 A | 2/1979 | Erickson et al. |
| 4,149,910 A | 4/1979 | Popplewell |
| 4,198,669 A * | 4/1980 | Kulwicki ................... 361/24 |
| 4,330,703 A * | 5/1982 | Horsma et al. ............. 219/553 |
| 4,368,380 A | 1/1983 | Igashira et al. |
| 4,376,374 A | 3/1983 | Bothwell |
| 4,687,893 A | 8/1987 | Rasmussen et al. |
| 4,719,335 A * | 1/1988 | Batliwalla et al. .......... 219/528 |
| 4,733,057 A * | 3/1988 | Stanzel et al. ............. 219/548 |
| 4,740,429 A | 4/1988 | Tsuno |
| 4,794,229 A | 12/1988 | Goss et al. |
| 4,801,783 A | 1/1989 | Milroy |
| 4,889,975 A * | 12/1989 | Farkas ......................... 219/548 |
| 4,922,083 A | 5/1990 | Springs et al. |
| 4,937,435 A | 6/1990 | Goss et al. |
| 4,981,761 A | 1/1991 | Ookouchi et al. |
| 5,059,768 A | 10/1991 | Hatanaka et al. |
| 5,113,315 A | 5/1992 | Capp. Michael L. et al. |
| 5,802,709 A * | 9/1998 | Hogge et al. ................ 29/827 |
| 5,835,004 A * | 11/1998 | Gemperle et al. .......... 338/212 |
| 5,965,193 A | 10/1999 | Ning et al. |
| 6,057,531 A | 5/2000 | Jones |

FOREIGN PATENT DOCUMENTS

| | | |
|---|---|---|
| GB | 2 228 165 A | 8/1990 |

* cited by examiner

Primary Examiner—Teresa Walberg
Assistant Examiner—Vinod D. Patel
(74) Attorney, Agent, or Firm—Michael D. Fitzpatrick

(57) ABSTRACT

A compact, inexpensive self-regulating heater for heating a surface to a prescribed temperature. A first embodiment comprises a PTC ceramic heating element which is conductively bonded directly to heavy copper (or brass) electrodes, which conduct both heat and electricity with low resistance and present a smooth, extended heat transfer surface. At least one of the electrodes (on at least one side of the PTC element) is configured for maximum surface area in contact with the article being heated. The preferred methods of manufacture of this invention result in the electrodes being prestressed in tension while the ceramic element is prestressed in compression at room temperature. Upon heating, during use, these stresses tend to disappear as the electrodes expand. A second embodiment comprises a heater tape constructed of multiple modules which are electrically and mechanically connected with bus wires having a bend therein to facilitate the wires being bent in the side to side direction as well as in the up and down direction so that the heater tape can follow an irregular path. The modules are mounted in a flexible rubber skeleton which is sharply necked down between the modules to allow ease of bending in the side-to-side direction as well as in the up and down direction.

34 Claims, 20 Drawing Sheets

SELF-REGULATING HEATER

1.0 RELATED APPLICATIONS

This application claims the benefit of U.S. Provisional Application No. 60/247,293 filed on Nov. 10, 2000.

STATEMENT REGARDING FEDERALLY SPONSORED RESEARCH

This invention was made with Government support under Contract Numbers N68335-99-C-0138 and N68335-00-C-0359 awarded by the Department of the Navy (DoD), Defense Small Business Innovative Research Program. The Government has certain rights in this invention.

2.0 FIELD OF THE INVENTION

The present invention relates to electrical heating devices that use positive temperature coefficient ceramic elements in self-regulating heaters.

3.0 BACKGROUND

Introduction

Production of heating tape is a substantial industry in the United States, with a large existing body of background art. Before developing my prototype for use in the heating system development in connection with the above cited contracts, some of the commercially available tape was purchased. I attempted to use it around areas on composite surfaces, to thermally isolate the areas from ambient so that they could be heated to high and precisely regulated temperature for the purpose of composite repair. Results with the available tape were not acceptable for a variety of reasons:

The most common use for heat tape is to prevent the cooling of an already warm, insulated object. The heat transfer rates that available heating tapes can provide are generally quite limited. The maximum power density found was 72 watts/foot, for an unregulated tape.

An "unregulated" tape is one which delivers heat at a substantially constant rate, based on the applied voltage and its own electrical resistance, regardless of its own temperature. In contrast, a "self-regulated" tape is one which automatically reduces its rate of heating at elevated temperature.

If the tape is truly "self-regulating", the rate of heat delivery decreases very dramatically at and above a specific threshold temperature. Alternatively, some heating tapes deliver a gradual and continuous reduction in heating rate as temperature increases. Such tapes are better described as "self-limiting"; they cannot truly regulate to a specific temperature, but they prevent the tape from heating to a potentially destructively high temperature.

As indicated above, the maximum power density found in a commercially available tape was 72 watts/foot. This was not only too low for our purpose (since our objective was to effectively heat to very high temperature in the presence of heat losses), but the lack of regulation made the tape unsuitable due to potential for destructive overheating.

The heating tapes are invariably electrically insulated. Electrical insulations generally have low thermal conductivity, e.g. on the order of 0.1 Btu/hr-ft-°F., as compared with about 200 Btu/hr-ft-°F. for copper. Therefore, the temperature of the surface being heated will be very much lower than the temperature of the heating element or wire, by an unpredictable amount, unless steps are taken specifically to minimize heat transfer resistance.

If a PTC (positive temperature coefficient) heating element is used, the material is generally either a specially prepared polymer or barium titanate ceramic. Thermal conductivity is low in either case, in the range of about 0.1 to 2.0 Btu/hr-ft-°F. Therefore heat developed throughout the body of the element is partially trapped, and the element interior is much hotter than the element surface.

As a result of thermal resistance and gradients within the element, power density of available self-regulating or self-limiting tape is even lower than for the unregulated components. The maximum power density found in an available self-regulating component was 50 watts/foot. Most commercial tapes are limited to less than 20 watts/foot and, as a practical matter, even 20 watts/foot is only attainable when the surface being heated is very much colder than the tape.

If the component is made literally in the form of a tape, being typically wide but thin, it typically has very little flexibility except in "vertical" bending (in the plane perpendicular to its width). It cannot be bent laterally, and it cannot readily be stretched or compressed.

If it is a PTC "tape", which typically is quite thick, it also is fairly rigid to torsion.

As a result, available PTC tapes can be applied to a flat surface or follow the simple contour of a cylinder (a pipe or tank, for example), but cannot follow arbitrary or complex contours to heat a complex structural surface, e.g. for the purpose of composite repair.

Other PTC components, which are designed to address the flexibility issue, do not have the relatively extreme width of "tapes". Width and thickness are essentially identical in such components, and they are called heating "cables" or "ropes" rather than tapes. As a result, they can follow complex contours, but available contact area for heat transfer is severely reduced. Power density and temperature regulation are inherently further compromised.

These problems were the impetus for the development of a new heat tape. The prototype showed much better power density, heat transfer and temperature regulation than the commercially available tape that had first been tried. However the prototype was handmade and was fragile, with limited flexibility. The tape according to the present invention includes:

1. Available, actually attainable power density up to or even exceeding 120 watts/foot.
2. Thin-film (e.g.≈0.010" (0.25 mm) or less) electrical insulation, for improved heat transfer.
3. Wide, flat tape geometry.
4. Easy flexibility in stretching and compression, torsion, and both lateral and vertical bending.

Purpose and Background Art

The purpose of the invention is to heat a surface to a prescribed temperature, with a compact and inexpensive heater that does not require any external regulator, i.e. is self-regulating.

For example, the invention may be used:

a. to provide a warm ambient temperature boundary around a region of controlled temperature, to facilitate accurate control and temperature uniformity within the region.
b. to heat a region to an elevated temperature with moderate precision, with no other means of regulation required.

c. to maintain elevated temperature, as of a pipe or vessel, without risk of overheating.

In addition, of course, the invention can also be used in the manner of background art self-regulating heaters, to prevent a surface from becoming cool with no risk of overheating in varying conditions.

Existing devices directed to the same objectives include heater tapes, heating ropes, and a variety of special purpose heaters, especially those constructed with self-regulating (positive-temperature-coefficient, or PTC) heating elements.

In general, a PTC resistive heating element is one whose electrical resistance rises significantly with an increase in its temperature, thus limiting its potential power dissipation at constant voltage.

Some examples of relevant background art include U.S. Pat. Nos. 5,937,435; 5,922,233; 4,341,949; 4,324,974; 4,223,208; 4,117,312; 4,072,848; 4,673,801; 4,574,187; 4,425,497; 4,395,623; 4,330,703; 4,177,376; 3,914,727; 3,861,029; 3,749,879; and 3,748,439.

The following performance related problems are associated with the background art:

The regulated temperature is that of the heater, not of the surface being heated, so good heat transfer (low and predictable thermal resistance) between the heater and surface is essential for regulation. However good heat transfer is never achieved in the background art and the tolerance on "regulated" surface temperature is extremely wide.

The heating element must almost always be electrically insulated for safety, and electrical insulators are invariably thermal insulators as well. As a result, there will always be a large and uncertain thermal resistance and ΔT (temperature drop) within the insulating layer between the heating element and the surface.(Indeed, since PTC elements are generally either polymers or ceramics, not metals, there is often a high differential temperature between the element interior and its own surface.) Adjacent surface temperature will be substantially below heater temperature.

Background art devices offer very low power density. The "high power" variant or model of a typical commercially available self-limiting heater tape provides a maximum of about 20 watts/foot at normal room temperature, and power density decreases further with increasing temperature.

The devices are bulky and complex structures, relative to the simplicity of the resistive elements that are functionally central. Tapes with polymer elements are generally molded between two buses, but then the further molding on of insulation (applying a layer of insulation) adds bulk as well as thermal resistance. Ceramic elements are generally held in place, relative to conductive contacts, with clamps and springs. They are generally not soldered (not even silver-soldered) to relatively rigid metal members because metals expand much more on heating than ceramics do, and the thermal differential expansion could create destructive tensile stresses in the ceramic.

In some cases, particularly where polymer elements are used, there is no distinct regulation temperature. Instead, the element's electrical resistance increases gradually and continuously with temperature, which is unsuitable for regulation to a specific temperature within a reasonable tolerance.

The devices lack mechanical flexibility to accommodate surfaces of arbitrary contour to be heated.

Even the polymer-element heater tapes with construction similar to a two-conductor wire, even in a single degree of freedom (up-down bending), have very limited flexibility and cannot follow tight radii and complex surface contours. Available tapes have virtually no flexibility in a second degree of freedom (side-to-side bending and/or torsion).

Heating "ropes" are also available with flexibility in two degrees of freedom. However the heating ropes have very poor and very little thermal contact, even lower power density, and offer virtually no regulating capability.

Due in part to the no-soldering constraint, available products based on PTC ceramics can primarily prevent a hot surface from cooling, e.g. to prevent freezing or cooling of a process tank or pipe. They function as a kind of powered insulation, but they do not really have the capability to heat a surface and regulate its temperature with any degree of accuracy.

4.0 SUMMARY OF THE INVENTION

Description of the Invention, Drawings, and New Features

The term "heat transfer surface" is used repeatedly in this specification. It is defined for our purposes as the surface of a heater which is in contact with the surface to be heated, and through which the heat is transferred.

The PTC ceramic (e.g. barium titanate) heating element is soldered directly to heavy copper or other solderable metal contacts/electrodes, which can conduct both heat and electricity with low resistance and present a smooth, extended heat transfer surface or underlying base therefor. At least one of the electrodes (on at least one side of the PTC element) is configured for maximum surface area in contact with the article being heated.

For example, the electrode on at least one side may have an extended flat surface if intended for use in heating articles with flat or nearly flat surfaces. Alternatively the surface may be that of a threaded fastener, if heating an article with a mating thread (FIGS. 2–6, 14, 17, and 18).

Ceramic elements are used instead of a polymer element because of their sharp temperature characteristic, as illustrated in FIG. 20. This characteristic describes a typical element with nominal 2,000 Ω resistance at room temperature and transition temperature of 100° C. At temperatures up to the transition temperature, resistance is substantially independent of temperature, though it falls slightly as temperature increases.

Once the transition temperature is reached, the element's electrical resistance begins to rise rapidly, reducing power dissipation and generated heat, and limiting the attainable temperature. According to this typical PTC characteristic, by 110° C. resistance has risen to 3,500 Ω and power output is reduced from about 7½ W to 4 W. By 120° C., resistance is over 10,000 Ω1 and power output down to about 1 watt. Thus, depending on the heat losses and capacity of the surface being heated, the heater will generally reach equilibrium slightly above 100° C.

Soldering minimizes dimensions, and also minimizes thermal resistance between the element and the electrode, so that electrode temperature will generally be close to element temperature.

Soldering without risk of destructive thermal expansion on heating is made possible by any of several means:

1. Prestressing the copper components in tension and the ceramic element in compression. FIG. 3 illustrates an embodiment in which the surface to be heated is the threaded surface of a protruding bolt or stud. In this embodiment, the entirety of the copper components on both sides of the heating element are heated during soldering to above the melting point of the solder. Preferably the assembly consisting of the ceramic element and the copper components is heated up to soldering temperature through the copper, i.e. with heat applied from outside the assembly, through the copper to the junction of copper and ceramic element, while the assembly is pressed together. The assembly is then cooled relatively slowly back down through the melting point of solder.

By following this procedure, the copper is prestressed in tension and the ceramic element is prestressed in compression at room temperature, taking advantage of the strength characteristics of both components in the same manner as concrete prestressed with steel reinforcing bars. Upon heating, the residual stresses tend to disappear as the copper expands.

2. Utilizing numerous closely spaced deep grooves on the copper surface. FIG. 4 illustrates another embodiment directed to heating the threaded surface of a protruding bolt or stud, in which the copper surface to be soldered to the element includes numerous closely spaced deep grooves. The solder bond is effectively at the ends of stubby beams that can bend and shear relatively easily, to minimize stress on the element.

3. Utilizing a patch of copper screen. FIG. 5, showing another embodiment which is similarly directed to heating a threaded surface, illustrates a solder bond across a patch of copper screen, which serves a function similar to that of the deep grooves (described above in connection with FIG. 4).

Precautions such as those described above are necessary only because the element is being soldered to a substantial metal electrode. The electrode is thick relative to the element and is capable of exerting substantial force on the element absent such measures. If the metal form is relatively thin and small, such as electrical contacts with no mechanical or thermal function, then soldering is common without such precautionary measures.

Relatively heavy metal forms are necessary at least on one side, to assure maximum thermal contact with minimum resistance to heat transfer.

The soldered construction enables a number of novel configurations with performance advantages.

FIGS. 7–13 illustrate a prototype heater button which is a three piece soldered assembly. (FIG. 7 is an external view of a heater button and its internal details are hidden behind the electrical insulation which encapsulates the heater button. These internal details can best be seen in FIGS. 9, 10, 13.) This embodiment is directed to the objective of transferring heat through upper and/or lower flat heat transfer surface, to a compatible surface that is either flat or has very mild curvature. In the center of the prototype's sandwich construction is a small PTC element, about ¼"×½"×0.08" (about 6 mm×12 mm×2 mm) thick. The PTC element is soldered on both sides to copper discs that are thicker and larger than it is. Thus the heat transfer area, i.e. the area in contact with the surface being heated, is more than doubled from approximately 0.125 in (80 mm ) (area of the element) to 0.25 in (160 mm ) (area of a copper disc) with almost no temperature drop in the transition.

Electrical insulation on the copper disk may be an adhesively applied patch of dielectric film, with both the film and adhesive material suitable for elevated service temperature, such as polyimide film with silicone adhesive. The surface of this electrical insulation then is the heat transfer surface.

Such film with adhesive is commercially available as tape with total thickness less than 0.003", and can be readily cut to the shape of the surface of the copper disk. Alternatively and preferably, electrical insulation may be a thin film of heat resistant coating applied to the copper discs (FIG. 1). Thermal resistance is minimized, so that the surface being heated can indeed be heated to nearly element temperature. In this case the dielectric gap between the PTC heat-generating ceramic material and the heat transfer surface, which gap is comprised primarily of the electrical insulation, is less than 0.01" (0.25 mm) thick over substantially the entire contact or heat transfer area. This is achieved in part by making the surface of the copper disk adequately smooth, and flat or otherwise conforming to the surface to be heated, and by then applying a thin layer of insulation, the surface of which then constitutes the heat transfer surface.

Referring to FIG. 2, the heater is externally insulated with heat shrink tubing. More critical is the manner of electrically insulating internally, from the bolt or stud being heated, because insulation between the male and female threads could seriously impede heat transfer.

Referring to FIGS. 3 through 6, electrical insulation is provided by a black anodize film, only about 0.0003" (0.0076 mm) thick, on the threaded aluminum standoff/ sleeve that is a mild shrink fit in the heater. (The dielectric film on the standoff/sleeve, although present, is too thin to be shown in these figures.) The film is then completely protected from mechanical damage, provides strong electrical insulation between the heater body and threaded sleeve, and provides negligible resistance to heat transfer. The combination of the threaded sleeve with oxide-film insulation, with the soldered bond between the heating element and electrode, makes the entire system possible in an extremely compact and practical package. The total dielectric gap between the PTC heat-generating ceramic material and the heat transfer surface, which gap in this case is comprised primarily of the black anodize film on the aluminum sleeve, is less than about 0.0006" (0.015 mm) thick in total (including both internal and external sleeve surfaces), over substantially the entire contact or heat transfer area. This is achieved here in part by making the heat transfer surface conform to the surface to be heated.

Applications

Because of the relative precision with which temperature can be regulated, there will be numerous applications in process control and especially in the cure of high performance epoxy composite structures, particularly for the purpose of repair.

A heater tape constructed of multiple soldered PTC modules can be used to provide a warm boundary around an area to be heated through a precise temperature cycle, or to isolate the area from local heat sinks. This permits a dramatic improvement in temperature uniformity within the temperature controlled area.

In tests with this technique, temperature variation within a heated repair area was reduced, from more than ±20° F. (±11° C.), to only ±8° F. (±4° C.)(at the nominal control temperature of 210° F. (99° C.). Temperature uniformity was substantially improved over the entire heating and soak cycle (during which the surface was held, or "soaked", at a predetermined constant temperature for a specific period of time required by the repair material process).

Prior to the above-described test, the same test was attempted with a purchased heater tape that was also nominally self-regulating according to the background art. Due to the combination of low power density, poor thermal coupling (excessive thermal resistance to heat transfer between the heater and the heated surface) and lack of a sharp transition temperature, the background art heater tape yielded no noticeable improvement over attempts to heat the repair area without any heater tape at all around the boundary.

In addition to the use of the improved PTC heaters as a boundary around a repair area heated by other means, heaters according to the present invention can also be used as the primary source of heat for temperature regulation over an entire repair area. However this is only appropriate where a single specific cure temperature is called for, rather than a cycle of varying temperatures.

Finally, the heaters can also be used in the bonding of studs to composite surfaces, also with high performance epoxy resins and particularly in aircraft maintenance. Cure time is reduced from several days to only one hour by safely heating to the regulated, elevated cure temperature with heaters such as illustrated in FIGS. 2 through 6, 14, and 18.

New Features and Performance Advantages

Summarizing:

Ceramic PTC heating elements are soldered to metal electrodes that are large and thick relative to the elements themselves, with provision to avoid destructive tensile stresses in the ceramic on heating, e.g.:
  The elements are prestressed in compression at room temperature.
  The metal surface at the soldered interface is divided by deep grooves into a series of stubby beams, with the element conductively bonded to the ends of these beams.
Solderable copper or brass electrodes are provided with an extended surface area compatible in shape and form with the surface to be heated.
Heat transfer surfaces are to be electrically insulated with a thin dielectric film which may be applied, for example, as a tape or coating. The surface of the dielectric film then becomes the new heat transfer surface.
Electrical insulation can also be obtained by transferring heat from the brass or copper electrode to an aluminum intermediate member over an extended heat transfer area, after coating the aluminum member with an electrically non-conductive anodize such as black anodize. Preferably, the solderable and aluminum members are contacted with a prestress, such as by shrink fitting the copper over the aluminum, so that the anodize coating is prestressed in compression at room temperature.

More new features are described in connection with Other Embodiments.

Other Embodiments

FIG. 8 shows a plan or top view of a heater tape constructed of multiple modules such as the heating button of FIG. 7. Among its features:
a. The modules are connected by a flexible skeletal member that may be, for example, a strip of silicone rubber and/or fiberglass, with holes to accommodate the connection of upper-to-lower portions of each module.
b. The skeletal member may be sharply necked down between modules, as illustrated in FIG. 8, to allow ease of bending in the side-to-side direction as well as up and down.
c. Upper electrodes of adjacent modules are connected by a running bus-wire, as are lower electrodes by another bus-wire, so that all the modules are electrically in parallel though mechanically in series.
d. The bus wires are bent between modules so that the total length of bus wire between two modules is sufficient to accommodate up-down bending of the tape with neutral axis at the skeletal member. This is further illustrated in FIG. 10 which shows a side view of the tape undergoing a 90° downward bend. When the tape is bent in this manner, the bus wire closer to the center of curvature must become effectively shorter and the bus wire farther from the center of curvature must become effectively longer. The bends in the bus wire effectively store extra length of bus wire to accommodate the requirements of bending the tape.
e. The tape configured in this manner can bend up and down as well as sideways and can also be twisted in torsion to follow surface contours as necessary. A prototype tape of this type was used to provide a warm boundary about a repair area in a heavy section of graphite-reinforced epoxy. The tape provided an actual 120 watts/foot of heat to maintain temperature uniformity at the boundary as described above at startup, and, at equilibrium, more than 26 watts/foot.

5.0 BRIEF DESCRIPTION OF THE DRAWINGS

Figure 3:
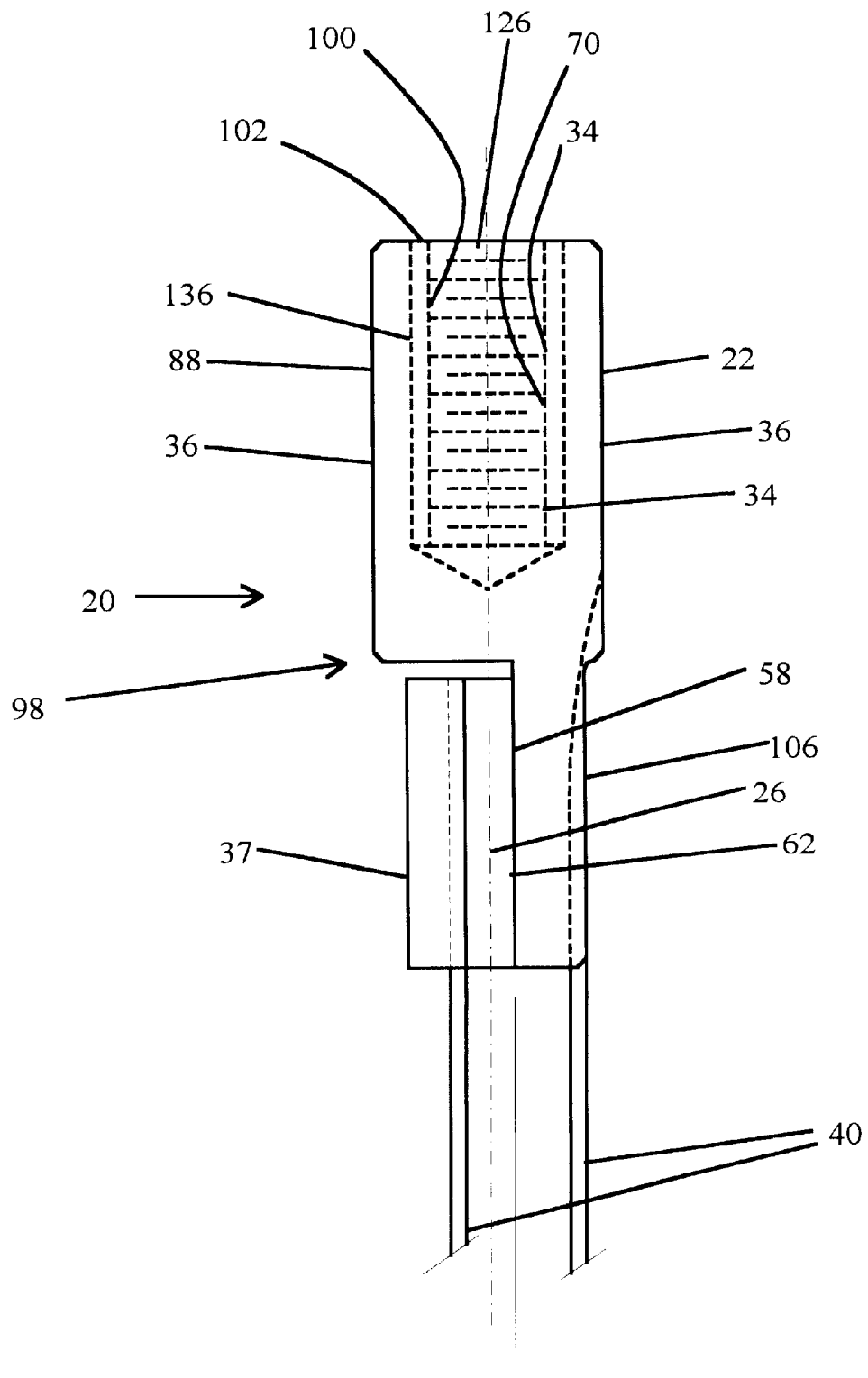

FIG. 3 shows a side view of a heater in which the entirety of the copper components on both sides of the heating element are heated during soldering to above the melting point of the solder. The heater is then cooled relatively slowly back down through the melting point of solder. Consequently, the electrode of the heater module is prestressed in tension and the ceramic heating element of the heater module is prestressed in compression at room temperature.

Figure 4:
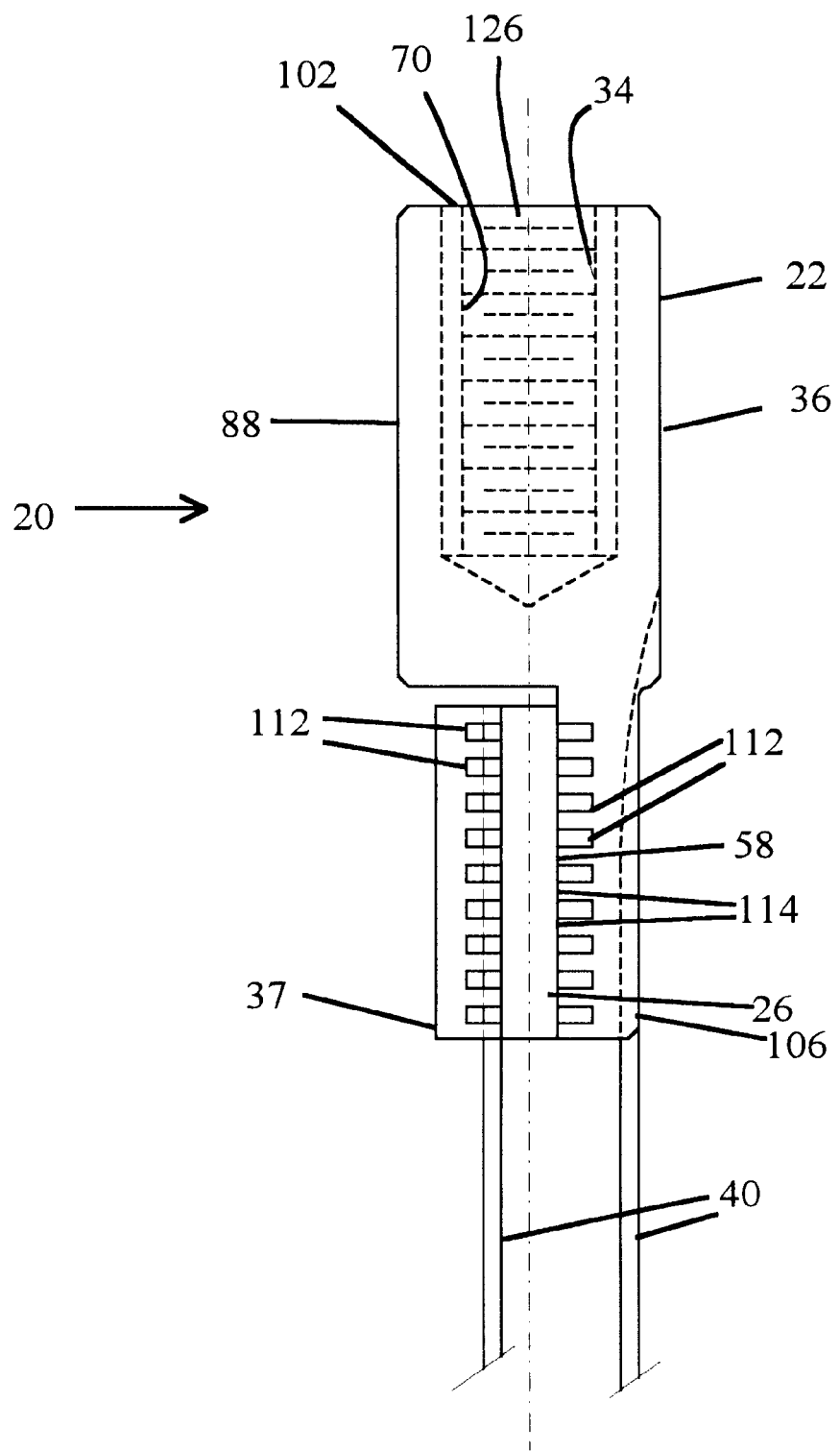
Figure 5:
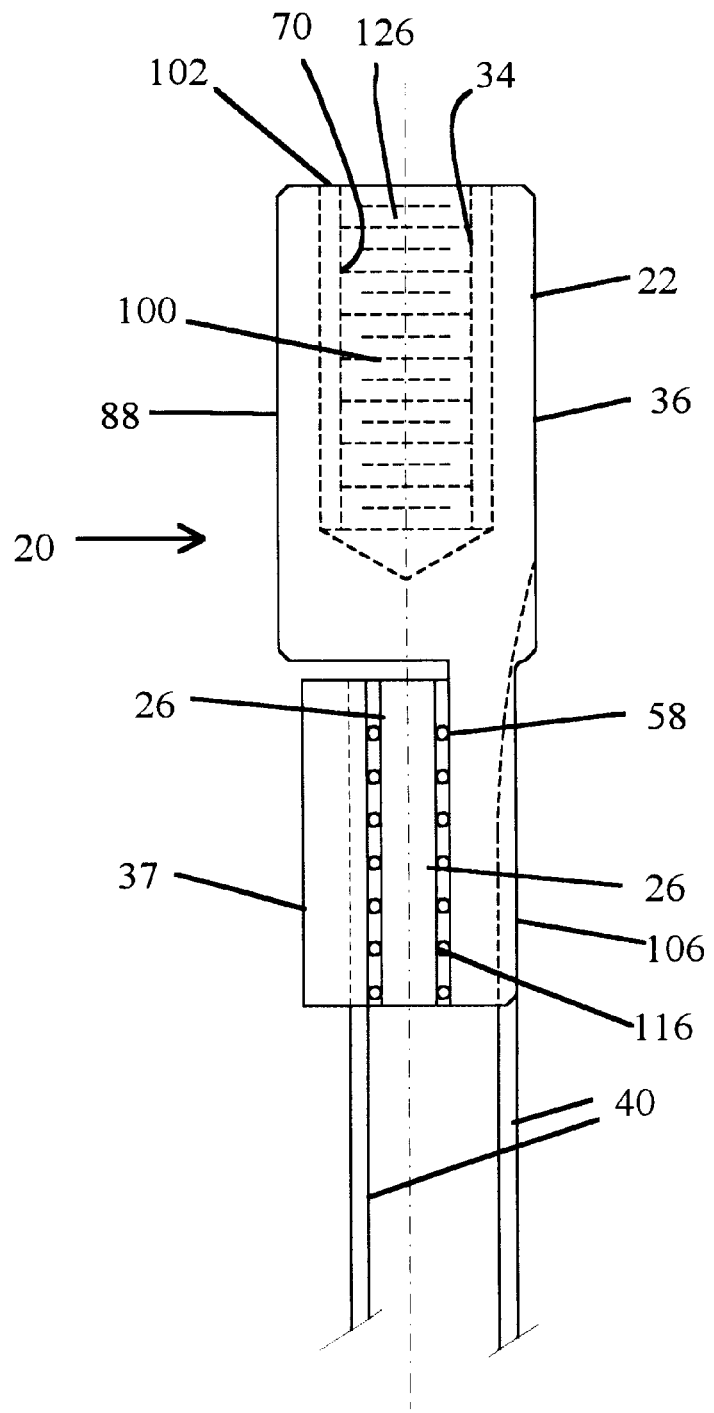
Figure 6:
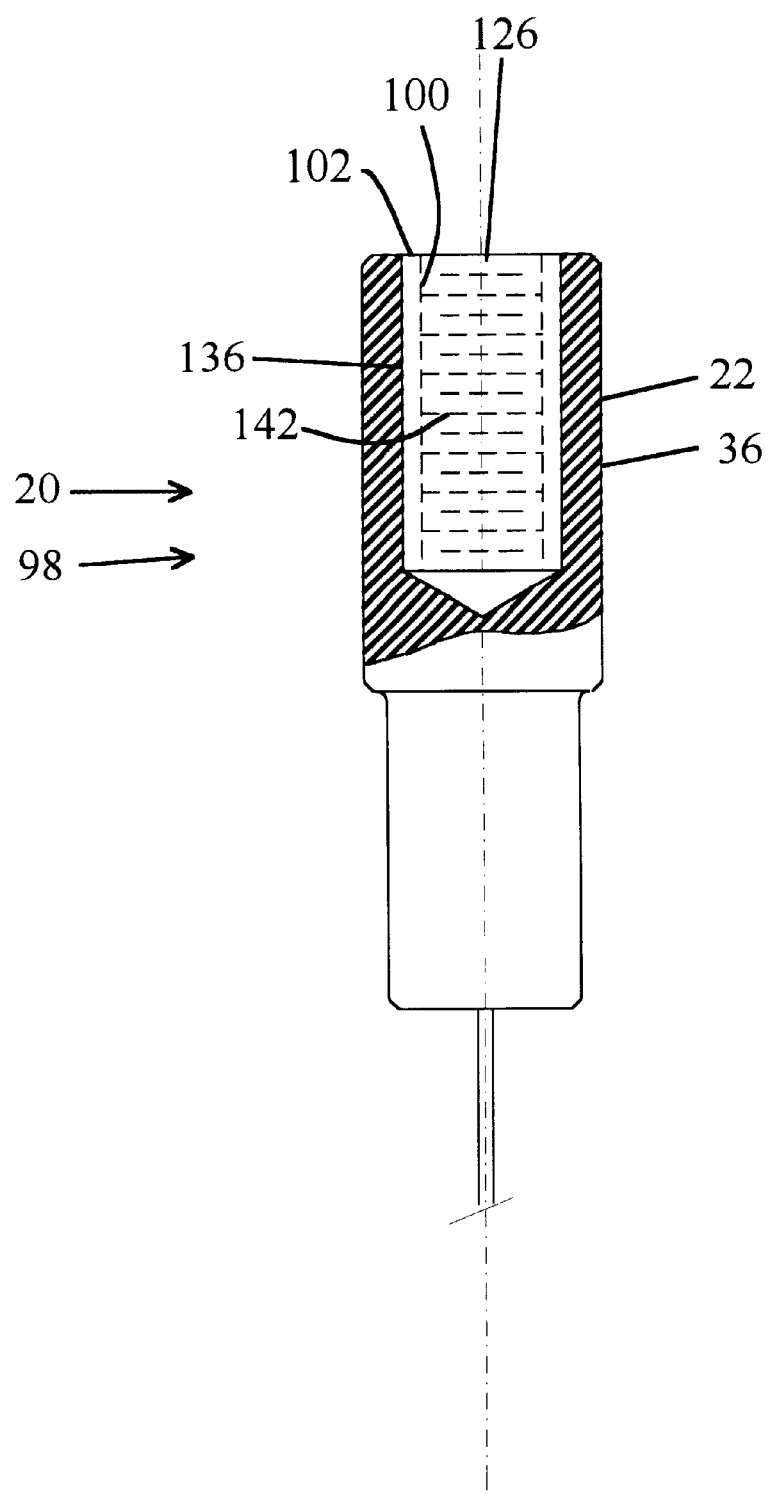
Figure 7:
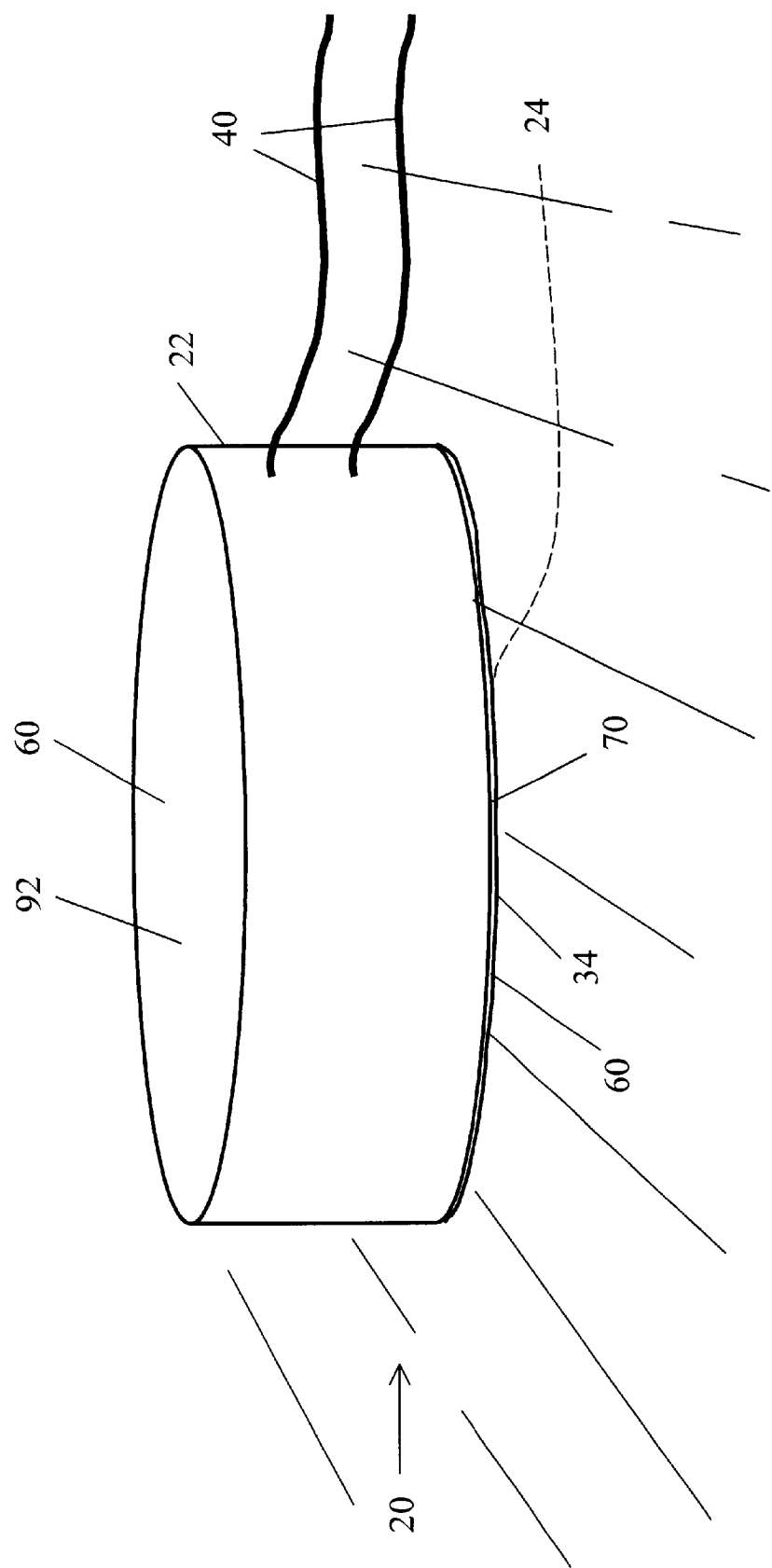
Figure 8:
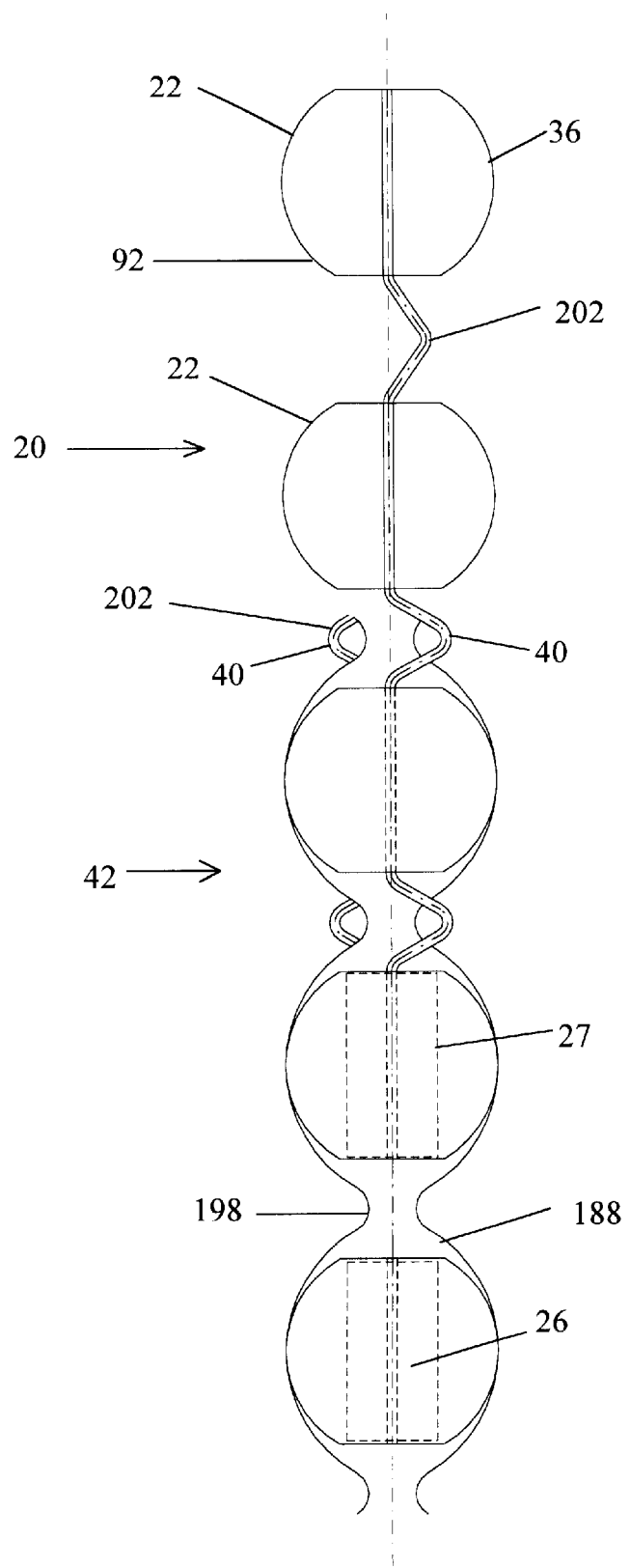
Figure 9:
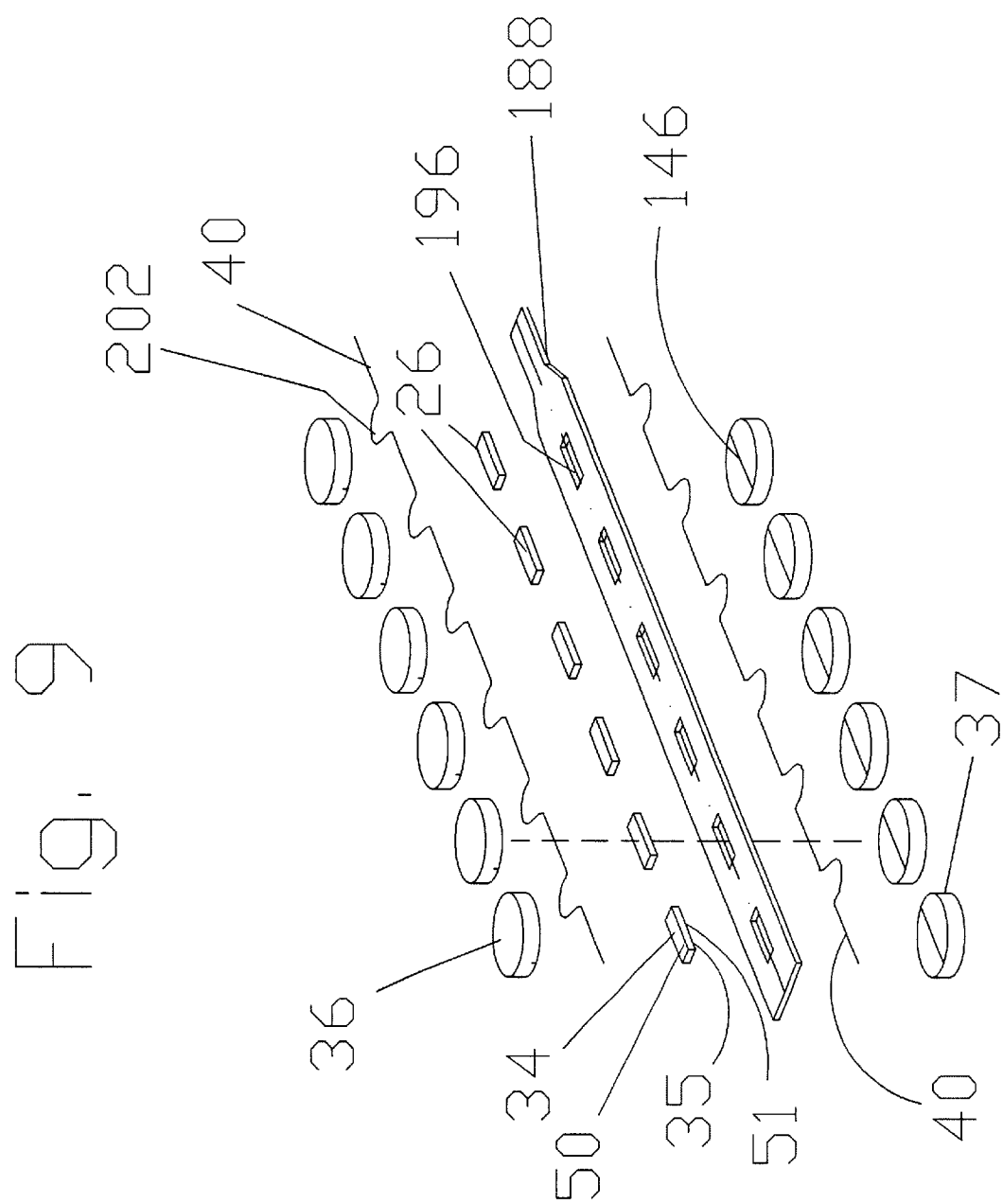
Figure 10:
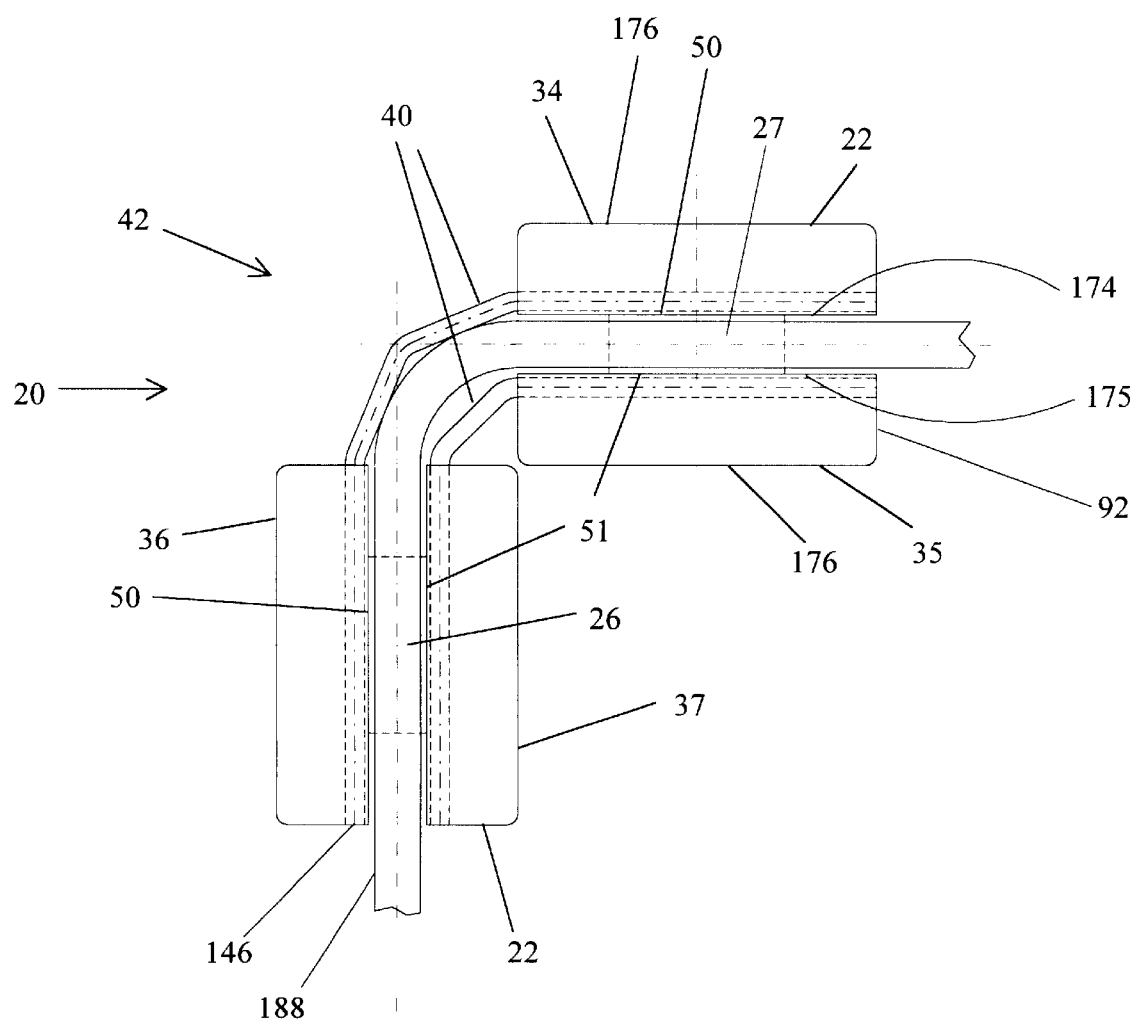
Figure 11:
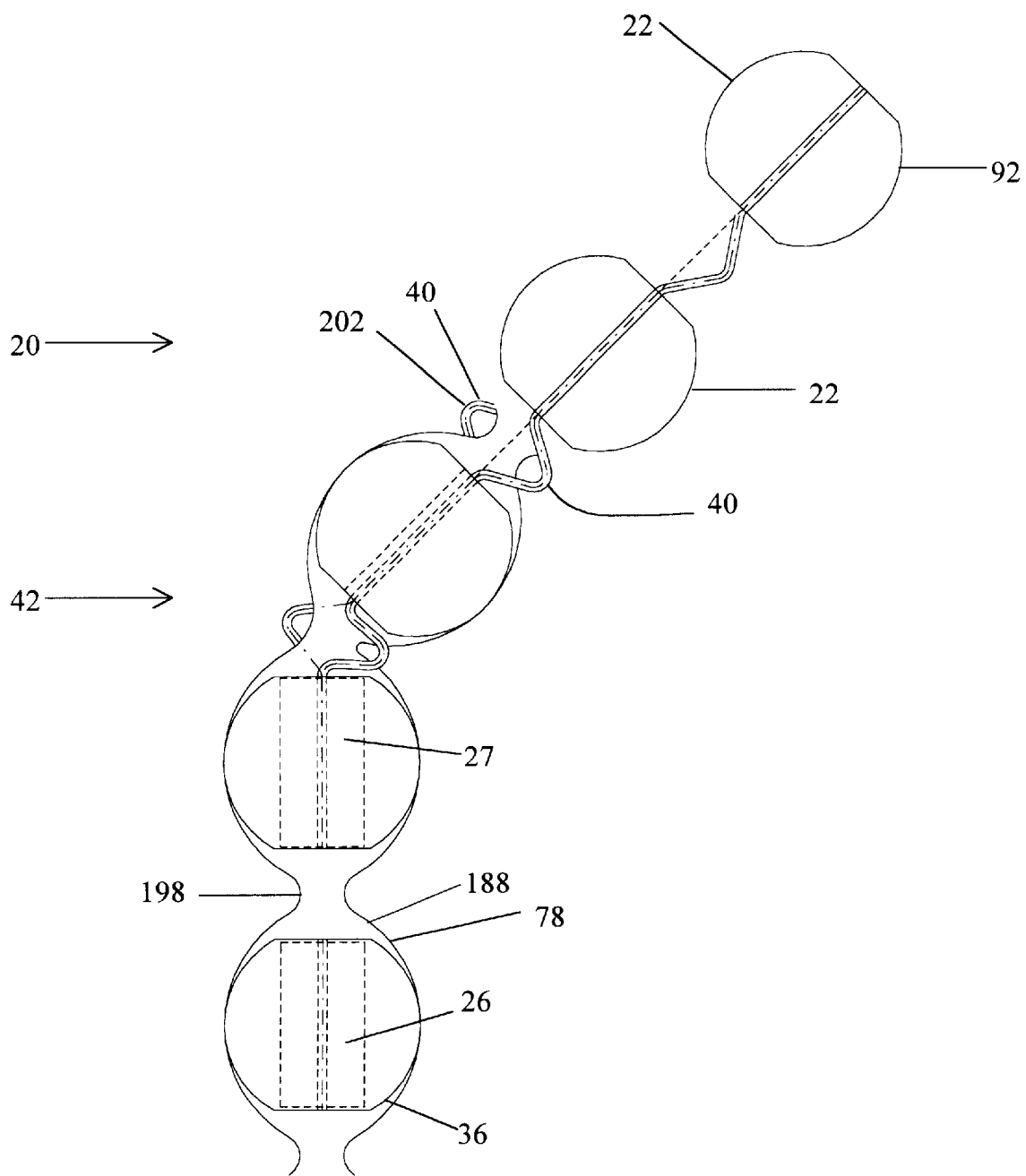

FIG. 4 illustrates a heater in which the copper surface to be soldered to the element includes numerous closely spaced deep grooves;

FIG. 5 illustrates a solder bond across a patch of copper screen, which serves a similar function as the deep grooves;

FIG. 6 shows a front view of the heaters of FIG. 3, FIG. 4, and FIG. 5;

FIG. 7 illustrates a heater button which is a three piece soldered assembly. This drawing also shows the pair of electrical lead wires which conduct electrical power to the heater button. The lead wires can also be extended out both sides of the button as shown in FIG. 8 to serve as bus wires to connect adjacent modules, which in the case of FIG. 8 are constructed like the button of FIG. 7;

FIG. 8 shows a plan or top view of a heater tape constructed of multiple modules such as the heating button of FIG. 7;

FIG. 9 shows an exploded view of the heater tape of FIG. 8;

FIG. 10 shows a side view of the tape undergoing a 90° downward bend;

FIG. 11 shows a plan or top view of a heater tape constructed of multiple modules such as the heating button of FIG. 7 undergoing a 45 degree lateral bend.

Figure 12:
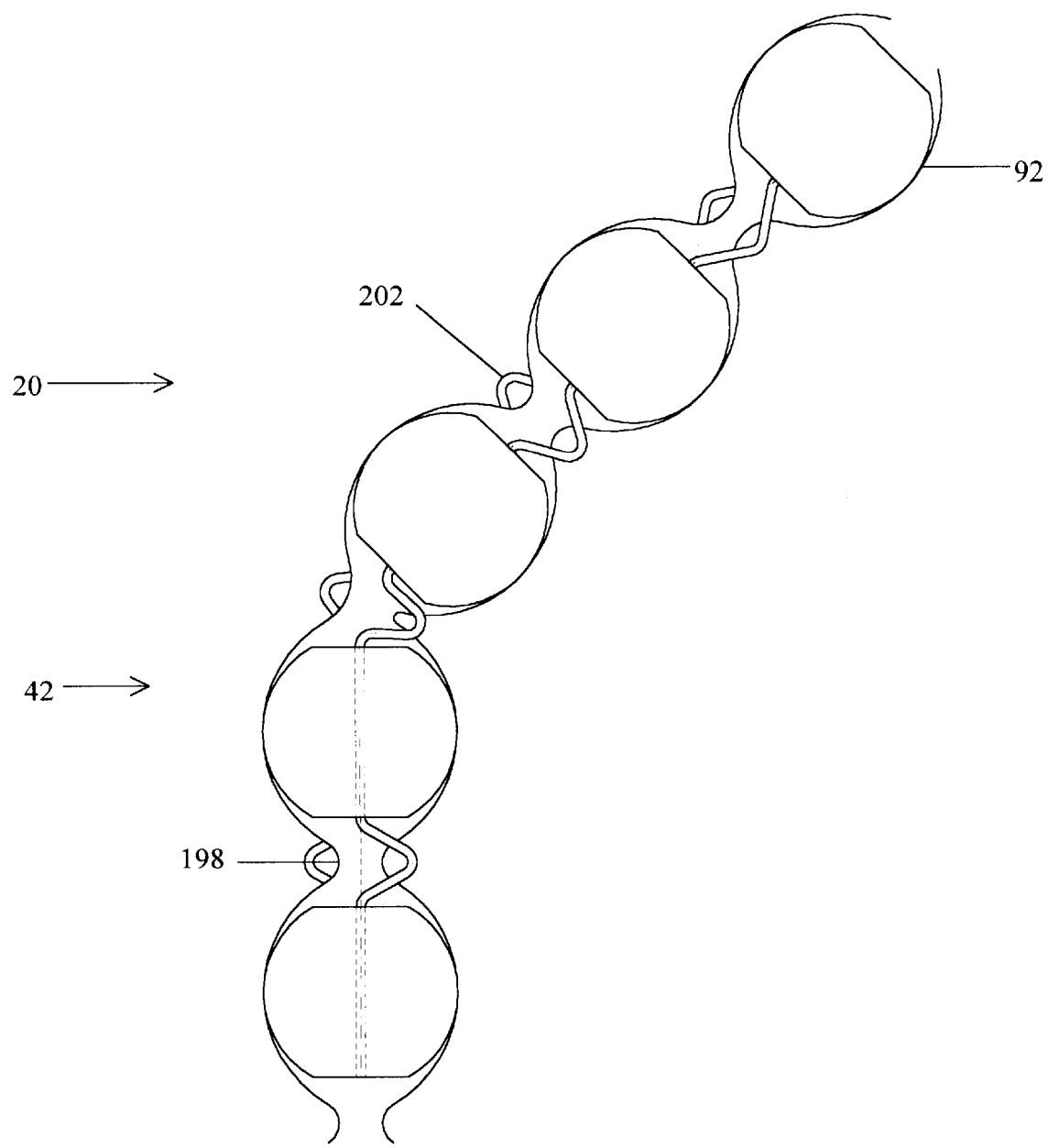

FIG. 12 shows another plan or top view of a heater tape undergoing a 45 degree lateral bend.

Figure 13:
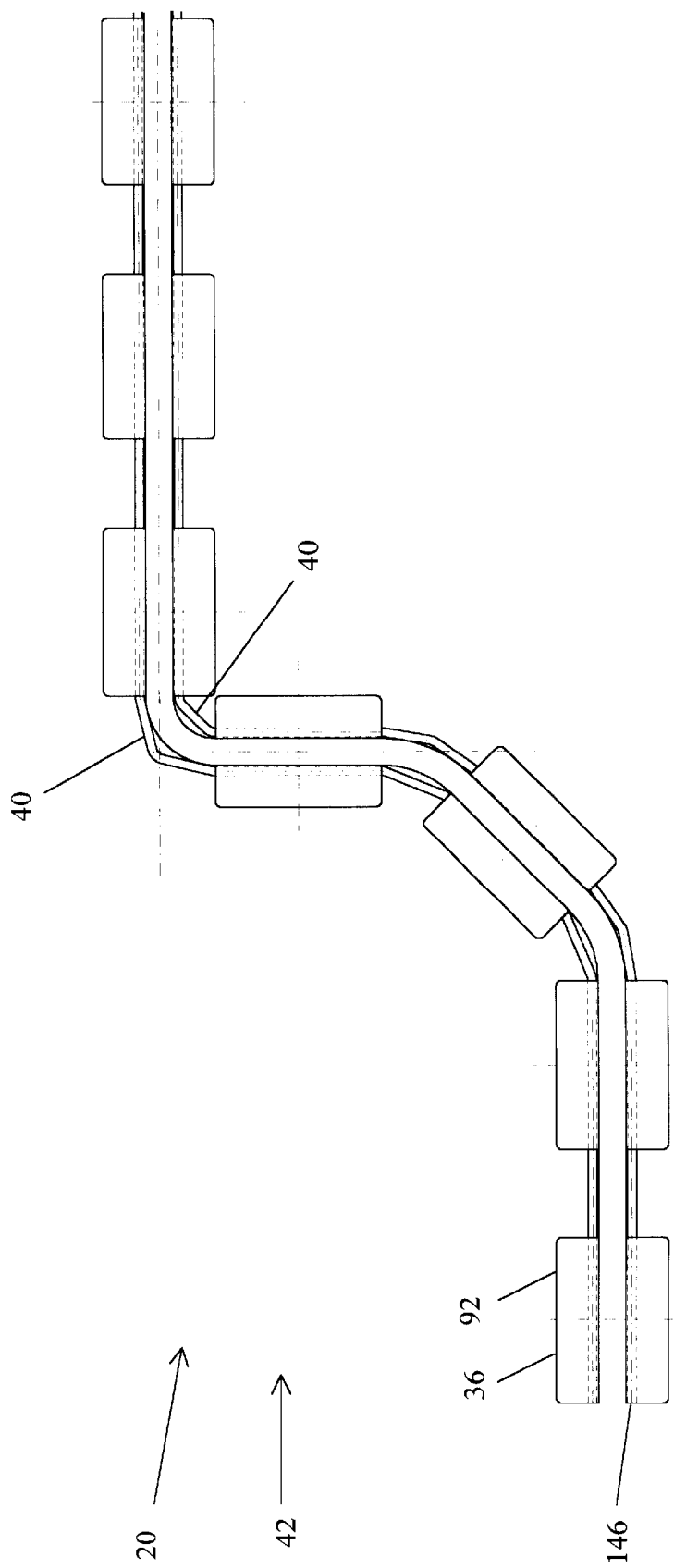
Figure 14:
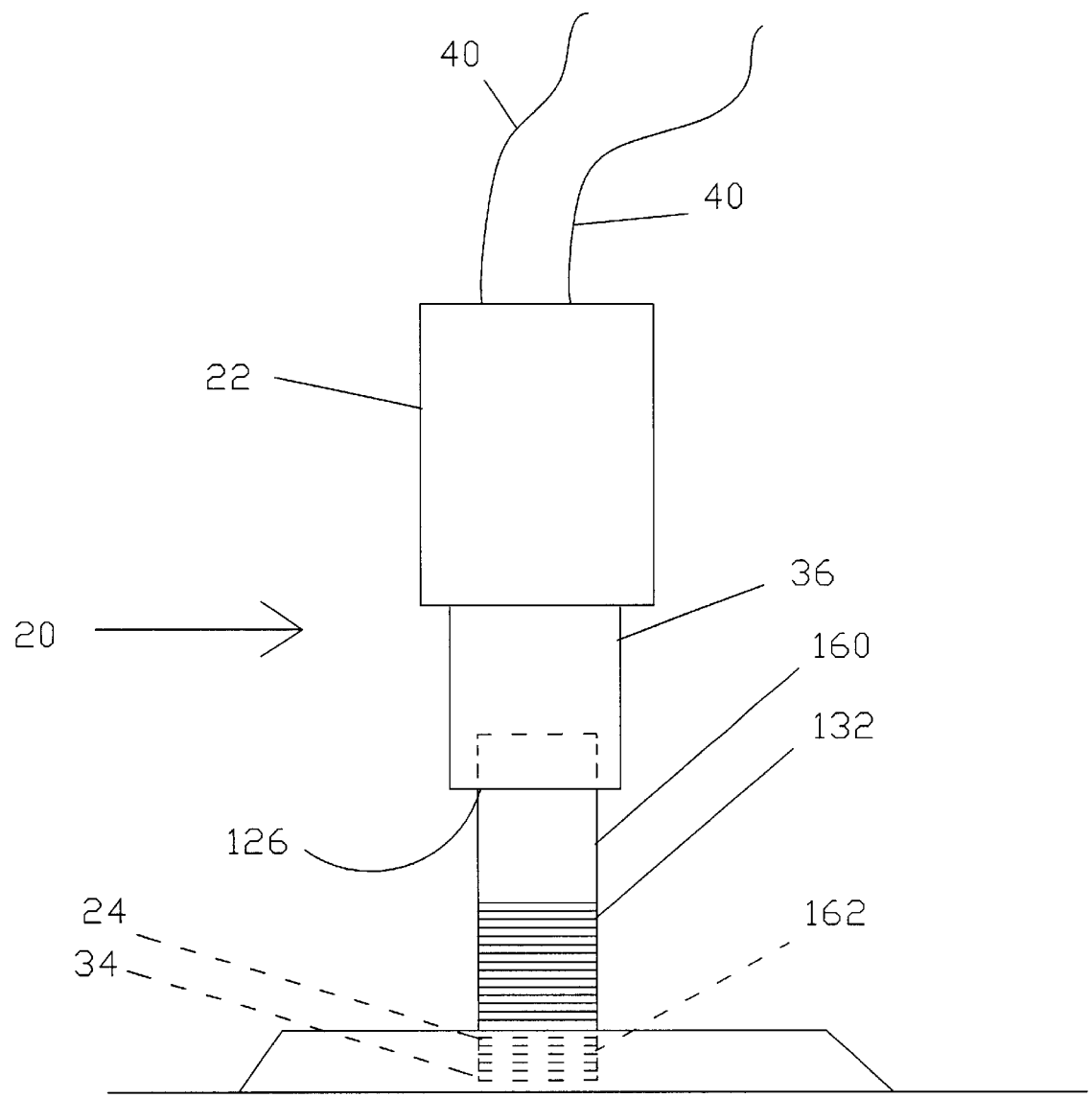
Figure 15:
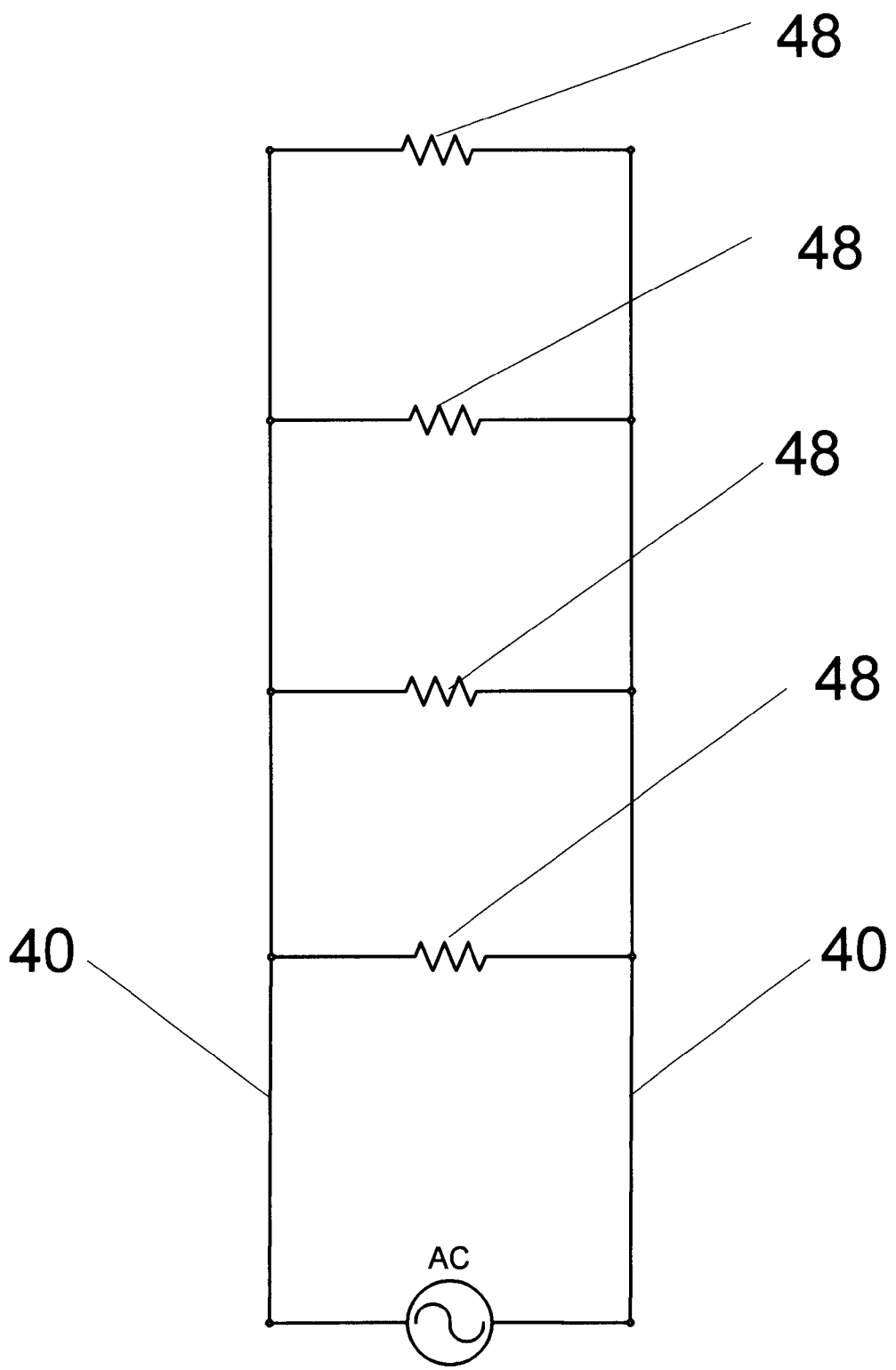
Figure 16:
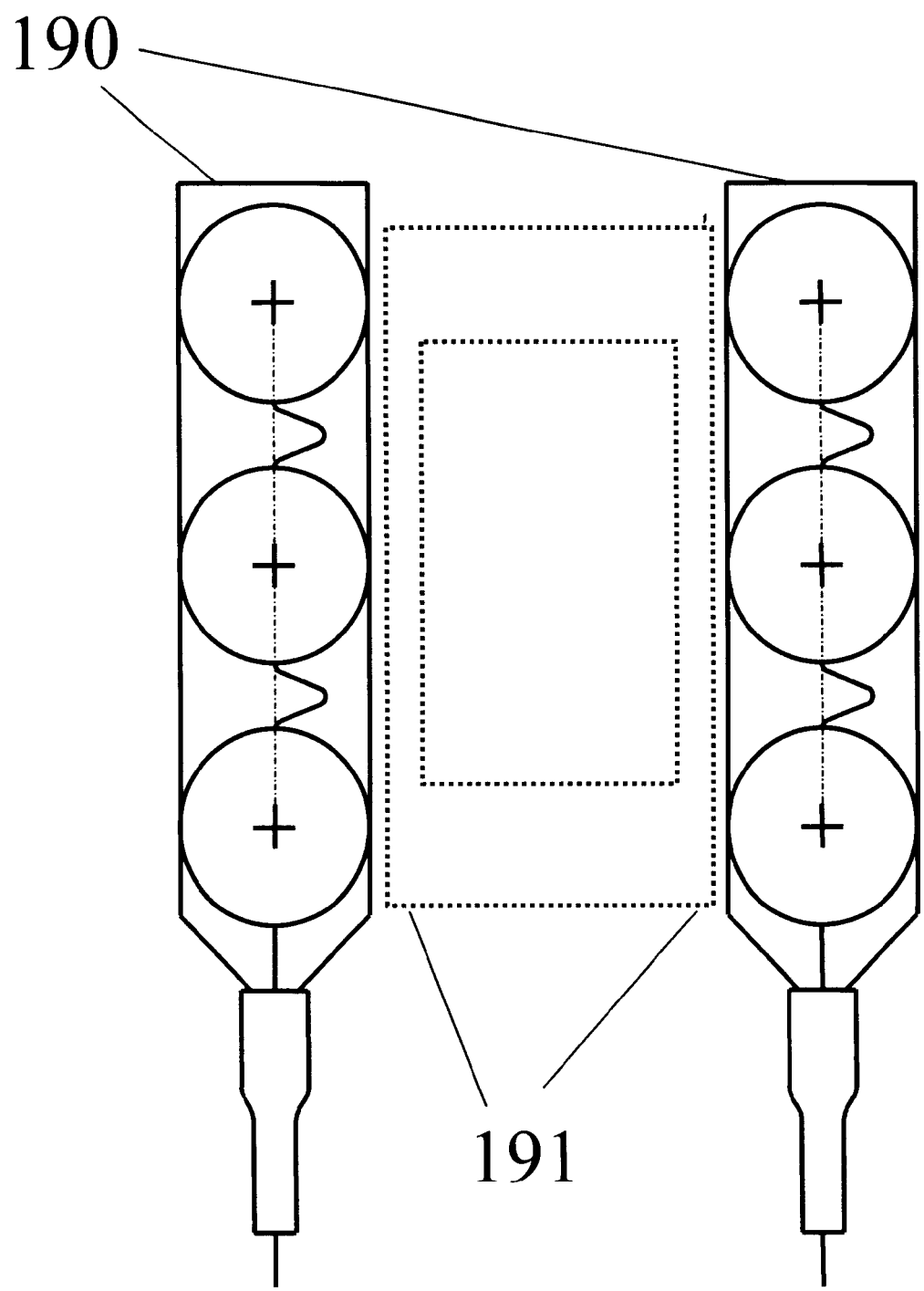
Figure 17:
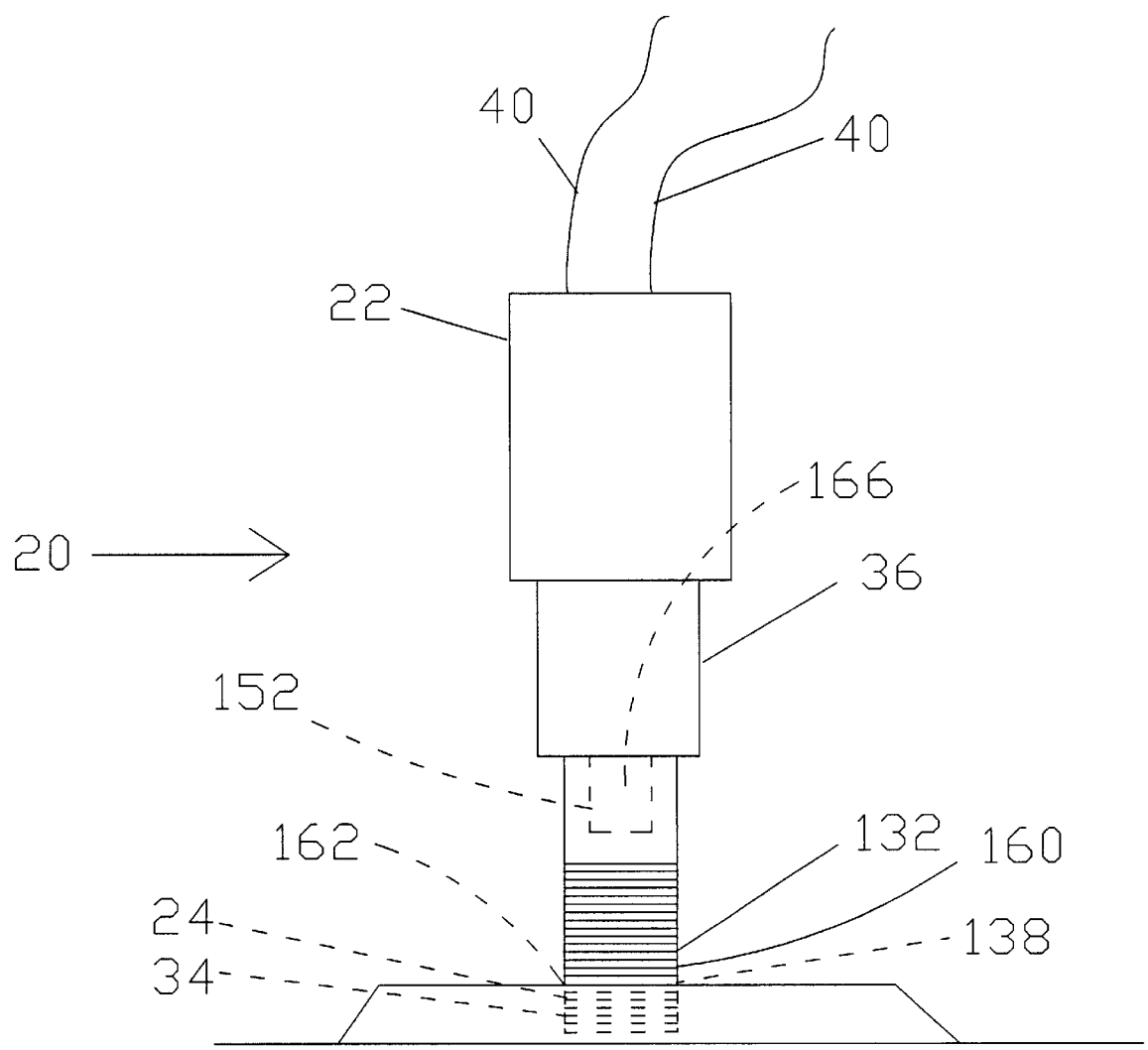
Figure 18:
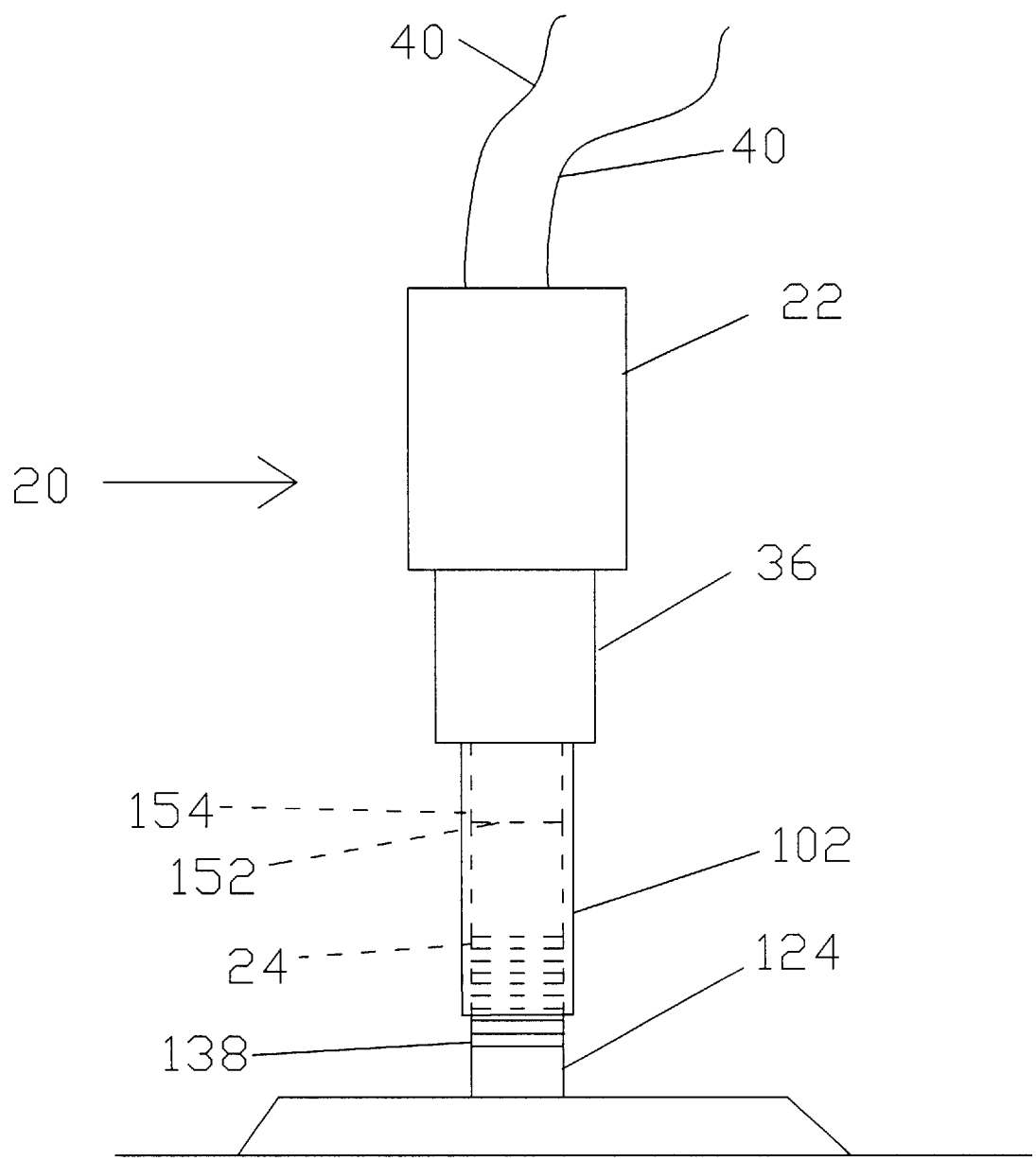
Figure 19:
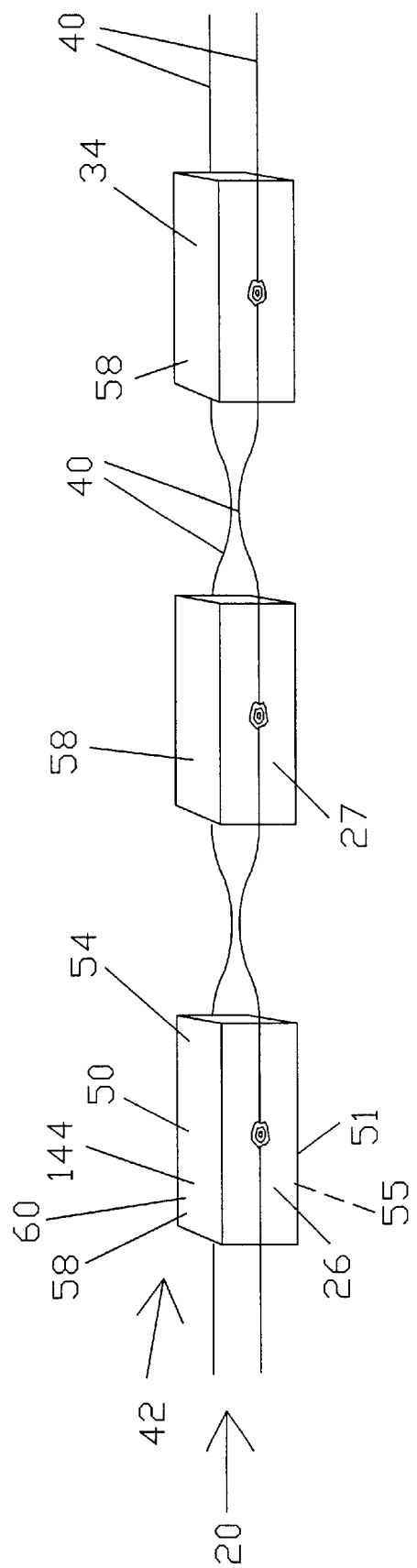
Figure 20:
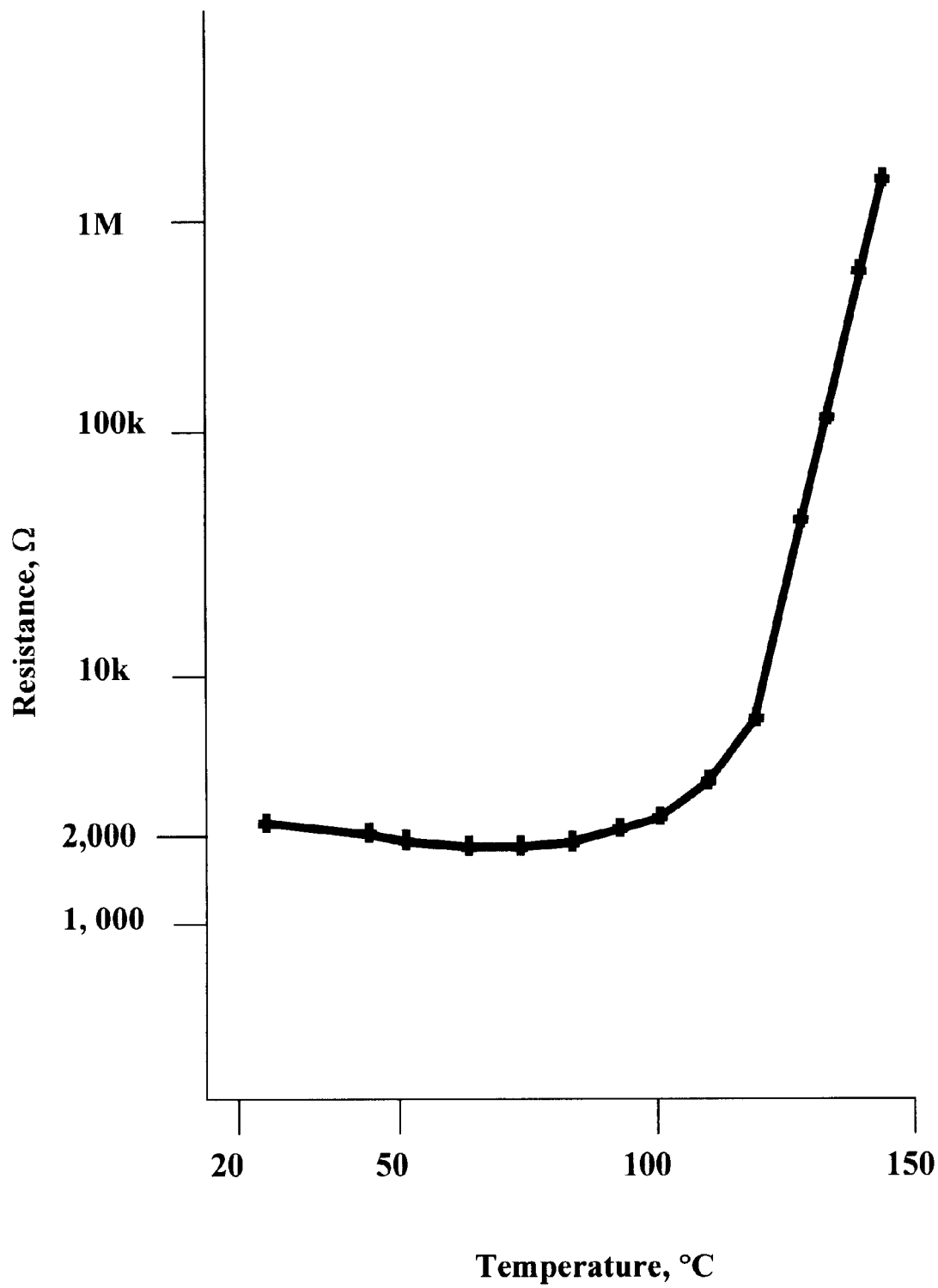

FIG. 13 shows a side view of a heater tape bent in the up-down degree of freedom over (or under) surface contours;

FIG. 14 is an elevation view of another heater whose surface is that of a threaded fastener for heating an article with a mating thread;

FIG. 15 shows an electrical schematic of a heater tape;

FIG. 16 shows two short tape sections alongside the bond area;

FIG. 17 is an elevation view of another heater with a threaded insert mounted on a protrusion from its electrode surface for heating an article having a hole with mating thread;

FIG. 18 is an elevation view of another heater with an internally threaded sleeve mounted on a protrusion from its electrode surface for heating an article having a stud with mating thread projecting from its surface;

FIG. 19 shows a front perspective view of a heater tape constructed of multiple modules each of which is a heater element in the shape of a flattened rectangular prism;

FIG. 20 shows a graph illustrating the sharp temperature characteristic of a Ceramic element;

6.0 DESCRIPTION

6.1 Detailed Description of the Elements

Detailed Description of the Elements of the Preferred Embodiment

Figure 1:
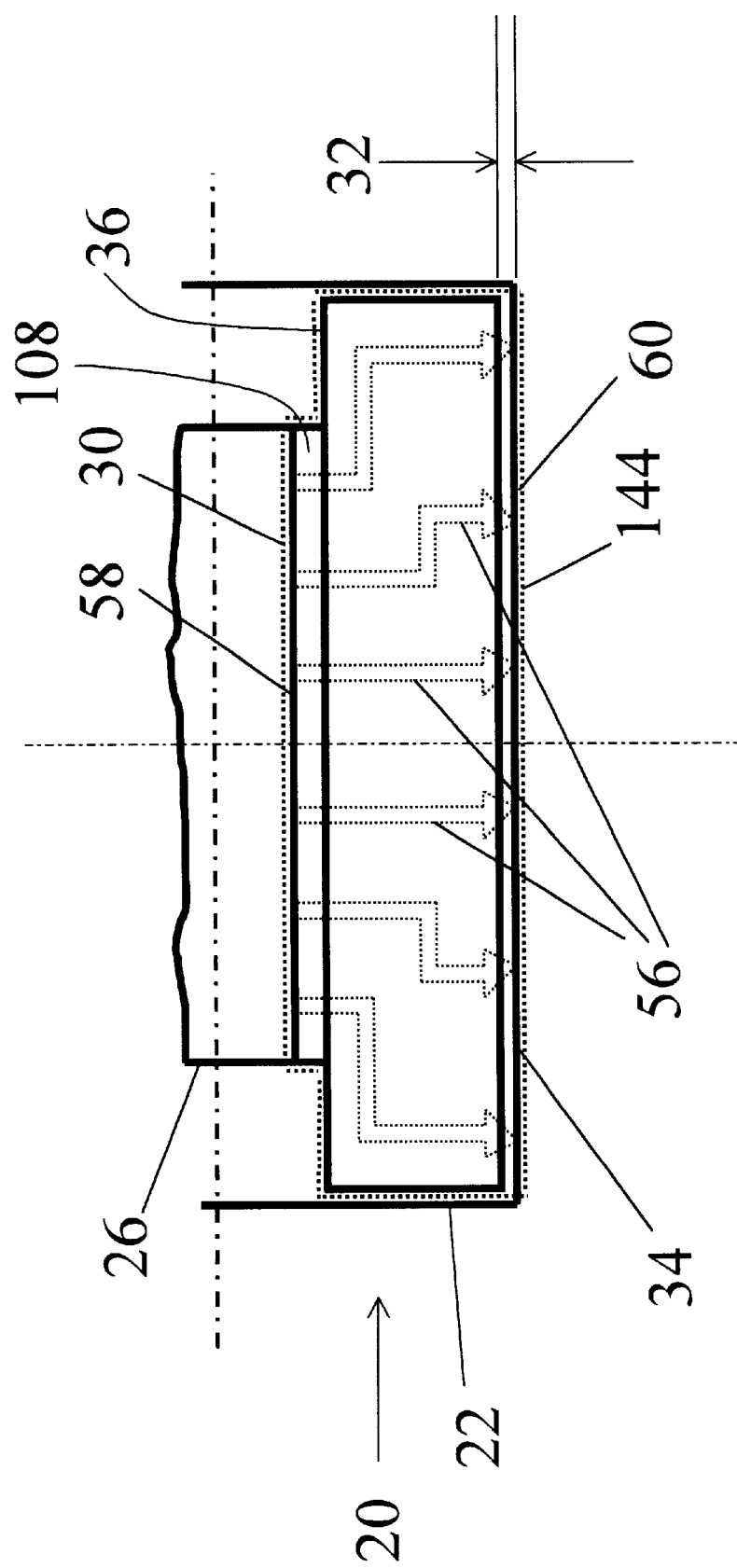
FIG. 1 shows a schematic diagram of a portion of a self-regulating heater for heating a surface. The diagram includes a portion of the ceramic heating element, one of the electrodes, the heat transfer region, and the total dielectric gap within that region.

Turning now descriptively to the drawings, in which similar reference characters denote similar elements throughout the several views, FIG. 1 shows a schematic diagram of a portion of a self-regulating heater generally designated by the numeral 20.

The self-regulating heater 20, as shown in FIG. 1, consists of a single heater module 22. The self-regulating heater 20 as shown, for example, in FIGS. 8–13, includes a plurality of heater modules.

Module Description

The self-regulating heater 20 heats by conductive contact with a surface to be heated. The heater 20 includes:

Ceramic heating element 26

(at least) two electrical conductors 40,

Heat transfer region 30 within module 22

Total dielectric gap 32

Heat transfer surface 34, which is intended to contact the surface to be heated

The module 22 may also include one or more electrodes 36, the primary purpose of which is to transfer heat from the element 26, and possibly to provide a heat transfer surface 34 with greater area than that of the element 26 itself. Where one or more electrodes 36, 37 is incorporated as shown in FIG. 10, the electrodes 36, 37 are preferably bonded to the element 26 for lowest thermal resistance (resistance to heat transfer, or temperature drop across the boundary).

The module 22 may also include other features in connection with specific types of applications, which will be discussed in greater detail below, such as special sleeves and electrical insulation.

Finally, two or more modules 22 may be incorporated in an assembly 42 wherein the two current conductors, constitute bus conductors 40, 40 along which the two or more modules 22 are electrically connected in parallel. Mechanically, the modules may be arranged in linear series, so that assembly 42 is in the form of a tape as in FIGS. 8–13 and 19.

Explanation of Structural Terms

Ceramic (generally barium titanate) heating element

Has electrical resistance with a positive temperature coefficient, which means that the functionally significant relationship between resistance and temperature is that resistance increases with increasing temperature. Specifically, in the case of barium titanate, resistance is substantially constant until a transition temperature is exceeded, and then resistance rises very rapidly with temperature, which makes the elements useful for temperature regulation.

Most generally, the element is relatively flat and has the shape of either a disc or a flattened rectangular prism (a prism with rectangular ends).

The element may be in the shape of a very short cylinder, so short as to be disc-like in appearance. In that case the surfaces through which heat is transferred out of the element will preferably be the flat surfaces, i.e. upper and lower round surfaces of the disc. Also in that case, electrical power is generally applied so that current flows between the two flat surfaces. Therefore, if a round element is used, provision must preferably be made so that the conduction of electrical current to the two flat surfaces does not interfere with heat transfer from those surfaces. This is discussed further in connection with electrodes below.

As shown in FIG. 19, the element 26 may also be in the shape of a flattened rectangular prism or cuboid. In this case the extended flat upper and lower surfaces 54, 55 are still ideally the surfaces through which heat is transferred out of the element 26. It is possible to provide electrical current through opposing edges of a rectangular element 26, in which case the presence of electrical conductors 40, 40 should not interfere with heat conduction from the upper and lower flat surfaces 54, 55. In that case, special provision for heat transfer from those surfaces, such as electrodes, may not be absolutely necessary.

At least two electrical conductors

Two conductors 40, 40 are required to deliver electrical current and power to the resistive heating element 26, where it is converted to heat energy. In a single module 22, as shown in FIGS. 2–5, ordinary copper stranded wire with high temperature insulation, e.g. Teflon®, is preferable. Where multiple modules 22 are incorporated in a tape assembly 42, as shown in FIGS. 8–13, 19, other kinds of conductors may be preferred, as will be seen below.

Heat transfer region

As shown in FIG. 1, this is the region 30, within the module 22, through which heat is transferred from the element surface 58 to the heat transfer surface 34.

The heat transfer region 30 may be vanishingly thin. For example, as shown in FIG. 19, it is possible to provide a very thin electrically insulating dielectric coating 60, film or layer over a flat heater element surface 58, such that the insulated heater element 26 may then be contacted directly against a flat surface that is to be heated. In that case, the outer surface of the insulating dielectric film would be the module's heat transfer surface 34 and the heat transfer region 30 would be simply the thin layer of dielectric insulation 60.

As shown in FIG. 1, the heat transfer region 30 may also be extended (See FIGS. 2, 6, 14, 17, 18,). For example, it may be necessary to transfer heat from a flat element surface 58 to a curved, threaded, or otherwise contoured surface 24 to be heated. For the sake of efficient heat transfer, it is preferable that the module 22 makes intimate physical contact with the surface 24 to be heated, and therefore has matching contours 70. In that case a solid material 36 with high thermal conductivity is preferably provided as a heat transfer medium to transfer heat most of the way from the flat element surface 58 to the heat transfer surface 34 which has contours 70 that match the surface 24 to be heated. The preferable result is that heat transfer from the element 26 to the heat transfer surface 34 is almost entirely through this high conductivity material 36.

Also, for example, since the primary resistance to heat transfer is often between the module's heat transfer surface 34 and the surface 24 to be heated, it is preferable to make the area of that surface contact as great as possible. In that case, a solid material 36 with high thermal conductivity may be provided as a heat transfer medium to transfer heat most of the way between a relatively small element surface 58 and a relatively large heat transfer surface 34. Again, the preferable result is that heat transfer from the element 26 to the heat transfer surface 34 is almost entirely through this high conductivity material 36.

The region consisting of intermediate material or materials, containing substantially the entire heat flux 56 (See FIG. 1), of heat transferred from the element 26 to the heat transfer surface 34, is the heat transfer region 30. To the extent possible, it should consist virtually entirely of material with very high thermal conductivity. As a practical matter it may be impossible to entirely avoid transfer of heat through low conductivity materials within the heat transfer region 30, such as electrical insulators, but this should preferably be minimized.

Total dielectric gap

The total dielectric gap 32 is the total of gaps which may be present within the heat transfer region 30, across which heat must be transferred, within which the heat transfer medium has dielectric properties rather than the very high thermal conductivity characteristic of a metal.

In a module 22 that was ideal from a heat transfer perspective, there would be no dielectric gap. Heat would be transferred entirely through a metal such as copper, from the element 26 to the heat transfer surface 34 or, in the extreme, the element surface 58 would itself be the heat transfer surface. However in this case the heat transfer surface would be an exposed electrical hazard.

At the other extreme, module construction could include several dielectric obstacles to heat transfer. For example, a metallic heat conductor could be bonded to the element 26 with a high-temperature epoxy or silicone adhesive material on the order of 0.003" (0.076 mm) thick. This is not preferred, but it could be imposed by an application's requirements, such as in order to avoid the presence of live voltage on the heat conductor. Then, depending on the module's structural complexity and means of assembly, the heat conductor might be comprised of multiple parts with an average air gap, between nominally contacting surfaces, that might also be on the order of 0.002" (0.051 mm) thick, across which heat must be transferred. This could include the effect of the surfaces' roughness as well as details of shape and precision of fabrication.

Finally, in order to avoid a hard heat transfer surface 34 that could scratch or mar a fragile surface 24 to be heated, or in order to accommodate small shape variations in the surface 24 to be heated, the hard, metallic surface of high conductivity material 36 that is to be in immediate proximity to the surface being heated may be coated with a high temperature rubber material on the order of 1/64" (0.4 mm) thick (or about 0.015"). As defined above, the module's heat transfer surface 34 would then be on the outside surface of that rubber coating. Indeed, most background art heat tapes and related devices are covered with an elastomeric dielectric of that or greater thickness.

In this case the total dielectric gap 32, or combined total thickness of low conductivity materials through which heat flux 56 must pass within the heat transfer region 30, would be 0.020" (0.5 mm) consisting of the epoxy element-to-metal conductor bond, the air gap, and the rubber coating.

It is desirable to minimize the total dielectric gap 32. This requires attention to the shapes of nominally contacting surfaces, as well as their smoothness, generally the use of bonds rather than mechanical fasteners, appropriate choice of materials for bonding, design to minimize the number of parts (and transitions between parts) within the heat transfer region 30, and a single layer of the thinnest reasonable dielectric for reliable electrical insulation.

Preferably the total dielectric gap 32 should be no greater than 0.01" (0.25 mm). More preferably, it should be less than about 0.006" (0.15 mm), which, for example, is attainable with silicone rubber without sacrificing mechanical and insulation reliability. Most preferably, it should, where possible, be less than about 0.003" (0.076 mm), which can be readily obtained, where appropriate, with applied films and coatings such as polyimides, which may be applied as liquid or as solid film with high temperature adhesive such as silicone. Other preferred alternatives include high temperature coatings that are UV curable, or are applied as powder. Moreover there are certain situations where the dielectric insulation, which can be made to constitute virtually the total dielectric gap 32, can be comprised of the anodize coating on an aluminum part, in which case the total dielectric gap 32 will generally be less than 0.001" (0.025 mm), and preferably (and readily) less than 0.0006" (0.015 mm).

Heat transfer surface

The heat transfer surface 34 is, as described above, the module's external surface that physically contacts the surface 24 to be heated, and through which the heat is transferred. Its contour should ideally be an exact match to that of the surface 24 to be heated, to avoid any air gap between the two surfaces. In reality, an "exact" match is virtually impossible in most situations (unless the heat transfer surface 34 is, for example, molded in place and then never removed), but the surface should be designed to approach that ideal.

Electrodes

As described above, the heat transfer region 30 may include an extended structure of high conductivity material to transfer heat most of the way between the element 26 and the heat transfer surface 34. In that case, the extended structure will preferably be an electrode 36 of copper or similar easily solderable material that can be bonded to the element 26 by soldering, which yields minimum resistance to heat transfer.

The extended structure is called an electrode because, by virtue of its electrical conductivity and that of the solder bond, and the fact that it will be bonded to one of the element's flat surfaces 58 which is also where electrical contact is made, the electrode 36 will be at the same electrical potential as the element surface 58. However the electrode's voltage is a coincidental by-product of the requirement for high conductivity, and the electrode 36 does not necessarily convey current to the element 26.

Please see the drawings of the button module 92 (FIG. 7), and of the tape assembly generally indicated by the reference number 42 which, in this case, is a series of such button modules (FIGS. 8–13) (particularly the side view of the tape assembly 42 bending in the up-down degree of freedom as shown in FIG. 13). In these cases the conductor 40 that carries current is in the form of a wire or wire-like member and is in direct contact with the element surface (which is generally "tinned" with a high-electrical-conductivity metal such as silver or an alloy thereof). Therefore, when the module 92 includes an electrode, the electrode 36 which is also soldered to the silver element coating (or alloy thereof), is at the same voltage as the current carrying conductor 40, but does not itself carry current.

On the other hand, the drawings of the stud heater show a different situation. Here, as is shown in FIGS. 3–6, one of the electrodes 36 is the relatively large and complex form that holds the internal threads, which in this embodiment are in the internally threaded sleeve 102. The element 26 in this case is soldered to one of the electrode's surfaces, a current conductor 40 is soldered to the opposing surface 106, and current travels through the electrode 36 between the current conductor 40 and the element 26.

Thus the electrode 36 may be, but need not be, used to carry current. Its primary function is to enhance heat transfer, to form the high-thermal-conductivity material occupying most of the heat transfer region 30 as described above.

While one electrode 36 can be used in a module 22, it is preferable that two electrodes 36, 37 be used for the sake of structural symmetry. As described below in connection with the solder bond, the dissimilar thermal expansion coefficients of the electrode material, such as copper or brass, and the ceramic element 26, lead to differential thermal expansion when the module 22 heats up, and therefore to thermal stresses either when cold or when hot, or both. Steps are described below to minimize or eliminate the potentially destructive effect of these stresses. The steps will be most effective if applied with symmetry, thereby minimizing any additional stresses that could be caused by any asymmetrical (and therefore differential) mechanical load.

The Solder bond

As described above, if an electrode 36 is used, it should preferably be bonded to the element 26 and, preferably, solder bonded. However this makes the connection between those two components virtually rigid.

The thermal expansion coefficient of a typical electrode 36 material, such as copper, is much greater than that of the ceramic element 26. The two components may be soldered together such that their internal stresses are near zero at normal ambient temperature, e.g. 70° F. When heated to or slightly above transition temperature, e.g. up to about 250° F. in normal use, or higher for some special-purpose heaters, the electrode 36 will tend to expand substantially more than the ceramic element 26. Since they are bonded together along one entire surface of the element 26, the electrode 36 will attempt to stretch the element 26, thereby stressing the element 26 in tension (while the electrode 36 is stressed in compression).

As is typical for a ceramic, the element 26 such as barium titanate is brittle and weak in tension. As a result, heating the bonded module 22 as described immediately above, typically and frequently leads to element mechanical failure in tension. The present invention contemplates three means for alleviating such thermal stresses due to differential expansion.

Residual Stresses

In the first and most preferred means for alleviating thermal stresses due to differential expansion, the electrode 36 of the heater module 22 is pre-stressed in tension and the ceramic heating element 26 of the heater module 22 is pre-stressed in compression at room temperature. This is achieved, for example, by heating substantially the entire electrode 36 (or electrodes 36, 37) to above the melting point of solder when the module 22 is bonded together, and then allowing slow and uniform cooling at least to below the solder melting point. In this way there will be no significant temperature gradients in the electrode 36 and it will be uniformly expanded (as compared to the ambient temperature condition) when the solder solidifies. Then, as the bonded assembly 22 cools further to ambient, the electrode 36 shrinks more than the element 26, leading to residual tensile stress in the electrode 36 and residual compressive stress in the ceramic element 26.

The ceramic is very much stronger in compression than it is in tension, so it does not fail when so stressed. Then, when the module 22 heats itself up such as to about 250° F. in service, which is lower than the temperature at which the solder bond solidified, the differential expansion leads to reduction of the residual compressive stress but is not sufficient to stress the element 26 in tension.

Residual compressive stresses so induced are applied, at ambient temperature, along the surface where the electrode 36 and ceramic element 26 are bonded together. If applied unsymmetrically, along only one surface of a relatively thin, flat ceramic element 26, the compression of one side of the element 26 could bend it and lead to the opposite surface being subject to tensile stress. This is why the electrodes 36, 37 are preferably used in pairs, symmetrically. If applied symmetrically to both the opposing surfaces of the element 26, then both surfaces are in compression, there is no bending taking place, and the risk of element failure is very much reduced.

The inventor of the present invention has manufactured several such heater modules 22 in the form of heater buttons 92 with symmetrical pairs of electrodes 36, 37. They have been cycled through as many as 36 heating and cooling cycles between full operating temperature and ambient, with no element or structural failures at all.

Ribs and Grooves

The second means contemplated for alleviating such thermal stresses due to differential expansion is to provide deep grooves 112 in the electrode surface that is to be soldered. The solder bond is then made between the ceramic element 26 and the ribs 114 on the electrode surface, the ribs being thus comprised of the electrode material between adjacent grooves 112. Stresses due to differential thermal expansion will be substantially reduced if the thickness of the ribs 114, which is the distance between the adjacent grooves 112, is very much less than the depth of the grooves 112. This is because the ribs 114 can then be relatively easily deformed to move together, effectively shrinking the area over which contact is made with the ceramic element 26, whereas in contrast the ungrooved surface is relatively rigid.

Screen

The third means contemplated for alleviating thermal stresses due to differential expansion is to include a copper screen 116 embedded and bonded into the solder between the electrode surface and the ceramic element surface 58. This has two constructive effects in reducing stress in the element 26. First, it increases the solder bond's thickness by a significant multiple, e.g. from a bond thickness on the order of 0.001" (0.02 mm) or 0.002" (0.05 mm) thickness, to at least the thickness of the embedded screen 116 which may be on the order of 0.02" to 0.04" (0.5 mm to 1 mm). Second, the screen wires 116 deform more easily than a solid block of the parent metal, so the screen 116 relieves stress to some degree in the same manner as the grooves 112 and ribs 114 described above.

Specific Embodiments
First Preferred Embodiment—Heating a Threaded Stud

A nonpreferred variation of the first preferred embodiment would be used to heat a surface which has a threaded bolt or stud projecting therefrom. In a simplest form, the electrode is a substantial structural element because it carries heat over a significant distance and re-maps the heat flux to accommodate both the element surface shape (flat) and the surface to be heated (cylindrical and threaded). The electrode, which may preferably be copper or brass, includes a hole on its exterior surface which is threaded to receive the threaded bolt or stud of the surface to be heated. In this embodiment, the heat transfer surface is the threads of the threaded hole in the electrode surface. The heater module so comprised has excellent heat transfer characteristics because it has no significant dielectric gap at all, but it is potentially hazardous because the bolt or stud of the surface to be heated will be in electrical communication with the electrical power source of the heater.

As shown in FIGS. 3–6, the preferred variation of the first preferred embodiment has the objective of eliminating the hazard of effectively connecting the surface to be heated to line power. In this variation, the hole 126 in the electrode 36 is smooth rather than threaded. A cylindrical metal sleeve 102, its outer diameter sized to be a slight interference fit within the hole 126 in the electrode 36, is shrink fit within the hole 126 such that the metal sleeve 102 is prestressed in compression within the hole 126. The sleeve 102 has internal threads 142 that are concentric with its cylindrical outer surface 136. The internal threads 142 are of a size to engage the threads of the surface to be heated so that the sleeve 102 is configured as an internally threaded sleeve. In this embodiment, the heat transfer surface 34 is the threads 142 of the internal hole of the sleeve 102.

In this case the dielectric insulation is preferably applied as a thin film between the inside of the hole 126 in the electrode 36 and the outer surface 136 of the sleeve 102. Preferably the sleeve 102 is aluminum and the dielectric insulation is a non-conductive anodize film on the sleeve 102, the anodize film preferably being less than about 0.0004" (0.01 mm) thick and insulating the sleeve 102 from the electrode 36. Upon being shrink fit within the hole 126 in the electrode 36, the sleeve's insulating film within the hole 126 is pre-stressed in compression which keeps the film intact on heating, and which also completely protects the film from mechanical damage by virtue of being within the hole 126. In this variation, the film provides strong electrical insulation between the electrode 36 and the threaded sleeve 102, and offers negligible resistance to heat transfer. (This dielectric film is too thin to be seen in FIGS. 3–6 but is applied to the sleeve 102 as described above.)

In the manufacture of the threaded, anodized sleeve 102, it will be most economical to anodize the sleeve's entire surface rather than attempt to anodize only the external cylindrical surface, e.g. by masking the internal surface during processing. The anodize film is so thin that its presence on the sleeve's threaded internal surface will not significantly interfere with heat transfer. However the insulating film on the internal threaded surface will be subject to wear and damage in use and cannot be counted on for reliable electrical insulation. Its presence is therefore only a by-product of processing, and the significant and preferred insulation film is on the outer surface of the sleeve 102 that is in contact with the inside of the hole 126 in the electrode 36.

In a further variation on this first embodiment (FIG. 14), an insert 132 may itself protrude, as a heated rod 160, from the hole 126 in the exterior surface of the electrode 36, to accommodate a surface 24 to be heated that is a mating hole 162 which in this case is threaded. In this variation, the heated rod 160 may be threaded to accommodate it. Or, in a still further variation (FIG. 17), the heated rod 160 may be mounted on a cylindrical projection or protrusion 152 of the electrode 36 rather than in a hole therein, by means of an interference fit of the protrusion 152 into a hole 166 at one end of the heated rod 160. The heated rod 160 may be threaded at one end to engage the threaded hole 138 of the surface 24 to be heated, and have a smooth hole 166 with precisely sized internal diameter at the other end, sized to be an interference fit on the cylindrical protrusion 152 of the electrode 36. In this case the insulating film would preferably be between the external surface of the protrusion 152 and the mating internal surface of the partially threaded rod 160. The rod 160 may be aluminum and the insulation may consist of an anodize film as above. In this case, however, the shrink fit will result in the rod 160 and the anodize film insulation being pre-stressed in tension rather than in compression, so the anodize film insulation will not be as reliable as in the insert variation described above (in which the electrode includes a hole on its exterior surface for the insertion of an insert therein).

In a still further nonpreferred variation (FIG. 18) of this first embodiment, the electrode 36 similarly includes a cylindrical projection or protrusion 152 instead of a hole on its exterior surface. A sleeve 102 may be internally threaded at one end to engage the threads 138 of the threaded stud 124 of the surface 24 to be heated, and have a smooth hole 154 with precisely sized internal diameter at the other end, sized to be an interference fit on the cylindrical protrusion 152 of the electrode 36. In this case the insulating film would preferably be between the external surface of the protrusion 152 and the mating internal surface of the partially threaded sleeve 102. The sleeve 102 may be aluminum and the insulation may consist of an anodize film as above. In this case, however, the shrink fit will result in the sleeve 102 and the anodize film insulation being pre-stressed in tension rather than in compression, so the anodize film insulation will not be as reliable as in the insert variation described above (in which the electrode includes a hole on its exterior surface for the insertion of an insert therein).

In all of these variations, the electrically insulating film should preferably be between the mating electrode 36 and the mating metal insert 132 or sleeve member 102 that transfers heat to the surface 24 to be heated. Moreover, in every case the sleeve member 102 or insert 132 may economically be aluminum, electrically insulated with an anodize film, though such a film insulation is particularly attractive in those variations where the member is an insert 132 or a sleeve member 102 that is pre-stressed in compression as described above.

In all of these variations, the ceramic element 26 is preferably also bonded to a second electrode 37 that is much smaller (but is still large enough to contact and to be relatively structurally rigid with respect to the surface to which it is bonded). The purpose of the second electrode 37 is primarily to provide structural symmetry in pre-stressing the ceramic element 26 in compression, to avoid bending and development of local tensile stresses. Preferably the means for bonding is a solder bond 108. The section above entitled "Residual Stresses" provides the three means for alleviating thermal stresses due to differential expansion.

It may be convenient, as illustrated in FIG. 3, to connect at least one of the current conductors 40 by soldering to a portion of an electrode 36 that is removed from and not in direct contact with the ceramic element 26. In that case, which may be convenient depending on geometric constraints but is not required, the electrode 36 functions also to conduct electrical power to the heating element 26. In either case, the ceramic element 26 is preferably pre-stressed in compression at normal ambient temperature.

Figure 2:
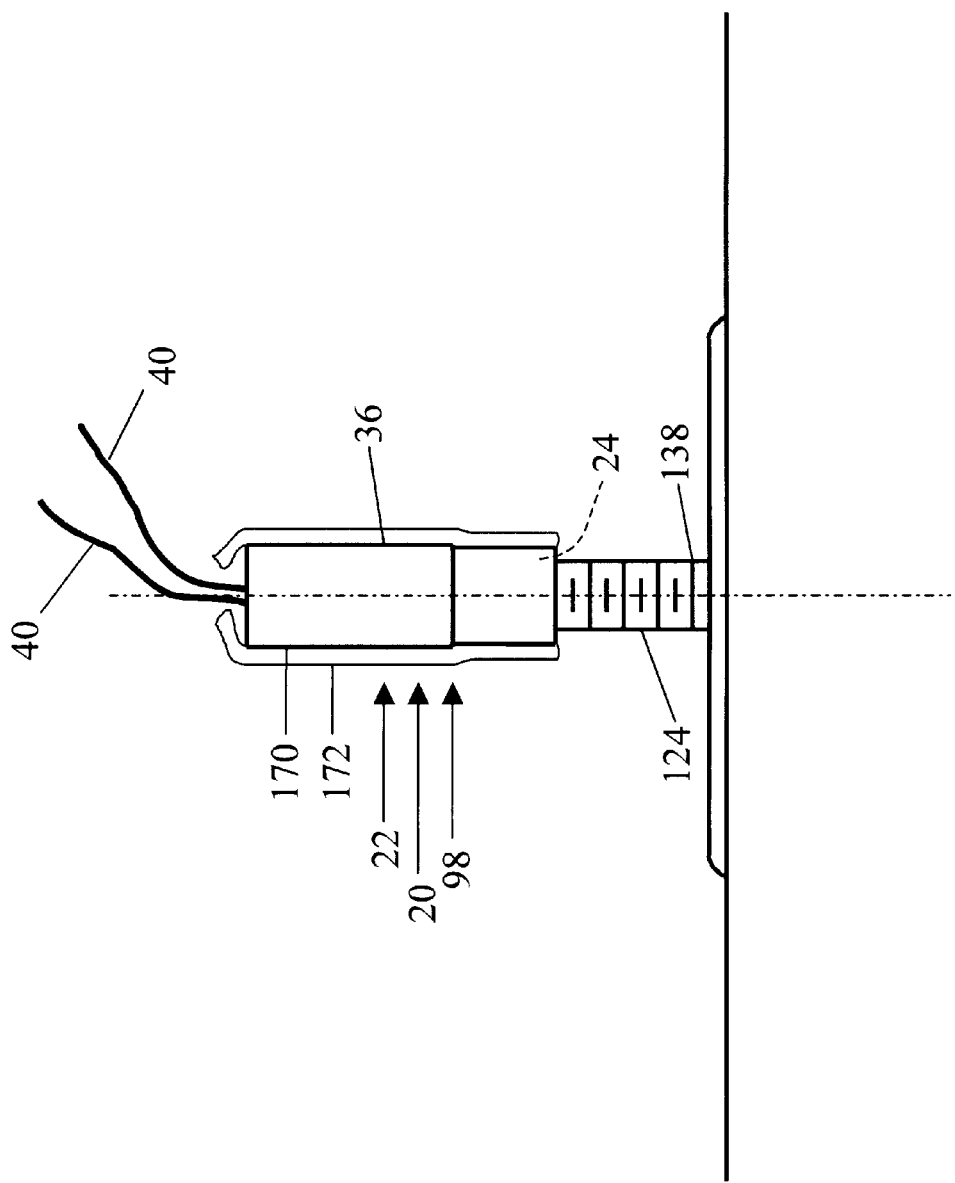
FIG. 2 is an elevation view of a heater whose surface is that of a threaded fastener for heating an article with a mating thread; Some of the insulation has been broken away to show underlying details.

The entire heating module 22, according to this embodiment, is roughly cylindrical in form, with a male or female cylindrical heat transfer surface 34 that may be appropriately threaded at one end, and preferably with current conductors 40 leading into the other end. As shown in FIG. 2, the external surface 170 of the entire module 22 is then conveniently electrically insulated with shrink tubing 172. (FIG. 2 shows part of the shrink tubing broken away to show underlying details.)

Second Preferred Embodiment—Heater buttons

In this embodiment as shown in FIG. 10, the ceramic element 26 is soldered to at least one electrode 36 along one of the element's flat surfaces 50, 51, and preferably is symmetrically soldered to two electrodes 36, 37 including one on each of its two opposed and substantially parallel flat surfaces 50, 51. Thus the button module 92 has an upper electrode 36 with a flat internal surface 174 bonded to the upper surface 51 of the heating element 26, and a lower electrode 37 with a flat internal surface 175 bonded to the lower surface 51 of the heating element 26. The ceramic element 26 is preferably pre-stressed in compression at normal ambient temperature.

At least one, and preferably both, of the electrodes 36, 37 has a substantially flat exterior surface 176, for use with surfaces to be heated that are themselves either flat or nearly flat. The electrode's flat exterior surface 176, which underlies and defines the module's heat transfer surface 34, is preferably substantially greater in area than the solder bond connecting the electrode 36 to the ceramic element 26. The current conductor 40, that carries current to a surface of the heating element 26 to which an electrode 36 is soldered, preferably is itself soldered close to (or very close to) the ceramic element 26, such as within an appropriately located clearance groove 146 in the electrode 36 as illustrated (See FIGS. 10 and 13). The electrode 36 therefore preferably functions primarily as an aid to heat transfer, by providing a much greater and flatter heat transfer area than that of the element 26 alone with current conducting leads attached, but is not a significant contributor to electrical current flow.

The electrodes 36, 37 are preferably entirely sheathed in a dielectric insulation for electrical safety. In this configuration, the total dielectric gap 32 has only one significant component, which is the electrical insulation 144 on the electrode's flat exterior surface 176. The module's heat transfer surface 34 is therefore the exposed surface of the electrical insulation 144 on the electrode's flat exterior surface 176. This insulation may be a thin dielectric film 144 bonded to the flat electrode surface 176 with silicone adhesive to form an electrically insulated, flat heat transfer surface 34. An example of such a thin dielectric film 144 is polyimide film. Alternately, the insulating film can also be applied as a powder such as, for example, high temperature powder coating formulations, or as a liquid. Preferably the electrode surface 176 has adequate smoothness so that the dielectric insulation 144 applied over the surface to form the heat transfer surface 34 can be substantially constant in thickness.

In this way, as shown in FIG. 10, a symmetrical heater module 22 is formed with a ceramic heating element 26 sandwiched between two metal electrodes 36, 37, having both upper and lower heat transfer surfaces 34, 35.

Preferably the means for bonding is a solder bond. The section above entitled "Residual Stresses" provides the three means for alleviating thermal stresses due to differential expansion.

Numerous prototypes have been built according to this embodiment. Electrical insulation 144 was provided with a 0.001" (0.025 mm) thick polyimide film, bonded to the exterior electrode surface 176 with a 0.0015" (0.04 mm) thick layer of silicone adhesive, for a total dielectric gap 32 of less than 0.003" (0.076 mm). In these prototypes, each of the ceramic heating elements 26 provided about 10 watts of heat at temperatures below the transition temperature, and had a transition temperature of about 230° F. (110C), above which heater power decreased very rapidly.

In a test with the heater buttons, four of them were positioned on a 0.08" (2 mm) thick panel of graphite-epoxy composite. Button diameter was about 9/16" (14 mm) and the four buttons were positioned in a square array, with a button at each corner of the square, with about 1" (25 mm) space between neighboring buttons. Center-to-center distance between each pair of neighboring buttons was therefore about 1 9/16" (40 mm). Power was then applied to the four heater buttons as 120 VAC line voltage. About five minutes was allowed for the system to reach thermal equilibrium. The temperature of the composite panel between the four buttons was measured with an infrared thermometer from Wahl Instruments, which had been checked both at room temperature and at the boiling point of water and was found accurate to within 2° F. (1C). The panel's temperature was 150° F. (65C) at the center of the array, and increased to almost 170° F. (77C) between pairs of buttons.

An insulating dielectric was applied as a solid polyimide film with silicone adhesive on some of the prototypes. The exterior surface of this insulating dielectric thus comprised the heat transfer surface 34. More generally, a dielectric coating suitable for the high service temperatures to be encountered can be applied as a liquid and cured in place. One example of such a coating is polyimide film or, preferably, UV curable high temperature coating that does not require a high temperature for curing. The electrodes 36, 37 and ceramic element 26 are also well suited for electrostatic spray coating processes. Alternately, the insulating coating can also be applied as a powder.

Third Preferred Embodiment—Basic Heating Tape

In a third preferred embodiment, as shown in FIG. 19, at least two ceramic heating elements 26, 27 in the form of flattened rectangular prisms are connected in parallel along and between a pair of bus conductors 40. In FIG. 19 the elements 26, 27 have the form of flattened rectangular prisms and are oriented so that their large, flat rectangular surfaces 54, 55 face upward and downward. The series of elements 26 along and between the two bus conductors 40 form an elongated heat tape assembly, generally shown by reference number 42.

Current conductors 40 are bonded along the lateral edges of the heating elements 26, 27, which, in FIG. 19 are shown as flattened rectangular prisms, so that electrical current flows across the elements 26, 27 from one side to the other. This is an embodiment in which the heat transfer region 30 from each heating element 26 to its heat transfer surface 34, consists entirely of whatever insulation 144 may be applied over the flat element surface 58. The insulation 144 may be applied as a thin film as described above, preferably completely encapsulating the elements, and is preferably less than about 0.003" (0.076 mm) thick.

In the case of a long tape structure (not shown) it may sometimes be expedient and economical to apply the insulation as a tubular membrane of silicone rubber tubing stretched over the tape from end to end. The membrane can be applied by:
(a) expanding a length of silicone rubber tubing with internal pressure;
(b) holding it in the expanded condition with external vacuum while opening the ends and releasing the internal pressure;
(c) lowering the insulated tape down through the expanded tubing; and
(d) releasing the vacuum and allowing the tubing to collapse onto and around the tape. An insulation thickness at the heat transfer surfaces of the tubing stretched in this manner over the tape can be obtained as low as 0.006" (0.15 mm).

However, the particularly novel feature of the tape assembly 42 according to the present invention is in the form of the bus conductors 40. As illustrated in FIGS. 8–13, the bus conductors 40 are bowed or bent between heating elements 26. The purpose of the bent conductors 40 is to allow the tape assembly 42 to bend.

Flexibility to bend in the side-to-side degree of freedom is inherent if the bus conductors 40 run above and below the modules of the tape assembly 42. However a tape assembly 42 configured in that way is normally inflexible in the up-and-down degree of freedom. In order to bend in the up-and-down degree of freedom, one conductor 40 must effectively become longer while the other effectively becomes shorter. The conductors 40 typically are not elastomeric, so this lengthening and shortening ability is not readily obtainable.

With the conductors 40 bent between elements as illustrated in FIGS. 8–13, one section of conductor 40 can become effectively longer by having its two ends pulled apart so that the length of conductor 40 between them becomes less bent. On the opposite side, the length of conductor 40 becomes effectively shorter by increasing the acuteness of its bend. In this way, the heat tape assembly 42 as a whole is provided with both up-down and lateral bending flexibility.

Fourth Preferred Embodiment—Enhanced Heating Tape

As shown in FIGS. 8–13, two or more heating modules 22, each module 22 having at least one electrode 36 bonded to the ceramic heating element 26, can be connected along and between two bus conductors 40 to form a heating tape assembly 42 with greater heat transfer surface area than a tape constructed of the heating elements 26 without electrodes (such as the tape assembly 42 shown in FIG. 19), since each electrode 36, 37 has greater exterior surface area than the heating element 26 to which it is bonded.

In the case of a long tape assembly, it may sometimes be expedient and economical to apply the insulation as a tubular membrane of silicone rubber tubing stretched over the tape assembly from end to end. The membrane can be applied by:
(a) expanding a length of silicone rubber tubing with internal pressure;
(b) holding it in the expanded condition with external vacuum while opening the ends and releasing the internal pressure;
(c) lowering the insulated tape down through the expanded tubing; and
(d) releasing the vacuum and allowing the tubing to collapse onto and around the tape.

An insulation thickness at the heat transfer surfaces of the tubing stretched in this manner over the tape can be obtained as low as 0.006" (0.15 mm).

Installed in this manner, the silicone rubber tubing serves as a flexible skeleton which structurally connects and spaces the modules and surrounds each heating element on all sides but does not interfere with heat transfer or mechanical connections above and below. The skeleton may alternatively be comprised, for example, of fiberglass running along both sides of the series of heating elements, and tied together between elements.

Preferably, as shown in FIG. 9, the skeleton 188 is comprised of a strip of heat resistant rubber, such as silicone rubber, with holes 196 along its length to accommodate the heating elements 26. In this way the heating elements 26 are constrained and located with respect to one another along the entire length of the tape assembly 42, but their extended flat upper and lower surfaces 50, 51 are exposed to be bonded to upper and lower electrodes 36, 37.

The rubber skeleton 188 is also preferably shaped to be reduced to a narrow neck 198 in the region between adjacent heater elements 26 and modules 22 as shown in FIGS. 8, 11, and 12. Preferably, the necked down sections 198 of the rubber skeleton are sufficiently narrow and sufficiently flexible, and sufficiently long relative to the dimensions of individual modules 22, so that at least 60° up-down bending and at least 45° side-to-side bending is permitted at the skeleton's narrow neck 198. Still more preferably, at least 90° up-down bending is permitted, as shown in FIG. 10.

Preferably, as shown in FIGS. 9 and 10, each module 22 is a symmetrical heater button 92, with a ceramic heating element 26 having substantially flat and parallel upper and lower surfaces 50, 51, with electrodes 36, 37 conductively bonded to the elements' upper and lower surfaces 50, 51, such that each heater module 22 is formed of a ceramic element 26 sandwiched between two metal electrodes 36, 37 and has both upper and lower heat transfer surfaces 34, 35. In this construction, upper and lower electrodes 36, 37 are in communication via the ceramic element 26 that connects them through the hole 196 in the skeleton 188.

In the preferred construction, as illustrated in FIGS. 9–13, the two bus conductors 40 that supply current to the two or more modules 22 in parallel run one above the other, one above the skeleton 188 and one below the skeleton 188, nominally along the center of the tape assembly 42 when viewed from above, rather than on opposite sides of the tape assembly 42. However, the conductors 40 are bent, as described in connection with the third preferred embodiment above. As in the embodiment described above, the bends 202 in the conductors 40 between modules 22 permit the tape assembly 42 to be bent in two degrees of freedom, both up-down and laterally. In this case, since the conductors 40 are one above the other, the ability to bend laterally is inherent. The bent conductors 40 in this case enable the up-down bending degree of freedom, by allowing the conductors 40 to effectively lengthen and shorten as necessary to provide overall structural bending.

Ordinary copper wire conductors are acceptable if bending is infrequent; for example, if the tape assembly 42 is bent once to conform to a specific surface and then left there. If the tape assembly 42 must be re-used and re-bent frequently, the severe local flexing of copper wires in the bends 202 between modules 22 leads to fatigue and breakage.

Where bending will be frequent, the conductors 40 with their bends are preferably made of a more flexible conductor material such as cords of graphite fiber. For the purpose of easy soldering, the graphite cords can be crimped within short sections of copper or brass capillary tubing and then the tubing sections soldered in place. Alternatively, finely stranded copper wire may be used, but then the strands must be coated before final assembly to prevent solder from flowing into the sections of wire between modules.

As described in connection with individual modules 22, insulation 144 on the flat faces top and bottom can be provided with solid polyimide film adhesive bonded to the modules' faces to form insulated heat transfer surfaces. Several prototypes were built in this manner. Electrical insulation was provided with a 0.001" (0.025 mm) thick polyimide film, bonded to the exterior electrode surfaces with a 0.0015" (0.038 mm) thick layer of silicone adhesive, for a total dielectric gap of less than 0.003" (0.076 mm). In the prototypes, the ceramic heating elements provided about 10 watts each of heat at temperatures below the transition temperature, and had a transition temperature of about 230° F., above which heater power decreased very rapidly.

Prototype tape sections each had three button modules 22 with center-to-center distance of ¾" (19 mm). Button diameter was about 9/16" (14 mm), and overall length of each tape was about 2¼" (57 mm), not including leads. Each tape therefore could provide a maximum of 30 watts heat.

In a test of the short lengths of tape, two of them were positioned on a 0.1" (0.25 mm) thick panel of graphite epoxy composite. The two were positioned parallel to each other and with about 1⅛" (29 mm) distance between them, so that the area between them formed a rectangle about 2¼" (57 mm) long and 1⅛" (29 mm) wide.

Power was then applied to the two tapes as 120 VAC line voltage. About five minutes was allowed for the system to reach thermal equilibrium. The temperature of the composite panel between the two tapes was measured with an infrared thermometer from Wahl Instruments, which had been checked both at room temperature and at the boiling point of water and was found accurate within 2° F. The panel's temperature was in the range from 170° F. to 210° F., the exact temperature depending on such factors as the exact location of measurement and the presence or absence of cooling drafts.

Insulating dielectric, the surface of which comprises the heat transfer surface 34, was applied as a solid polyimide film with silicone adhesive on the prototypes. Polyimide film can also be applied as a liquid and cured in place. The electrodes are also well suited for electrostatic spray coating processes. Moreover, the insulating coating can also be applied as a powder.

Method of Making Heat Tape

Note: The tape "skeleton 188" can be a sheet of silicone rubber. This is likely in the prototype, but not required or even generally optimal. Alternatives include, for example, molding the skeleton 188 in place (possibly bonded to the buttons), or a rope-like mechanical connection suitable for high temperatures (e.g. fiberglass).

In fact, depending on application requirements, it is possible to make the tape assembly 42 with no skeleton at all, the tape assembly 42 being held together by the two lead wires 40 that power it. For most applications, though, that would not be sufficiently mechanically stable.

Sheet silicone was selected for the prototype skeletons because it appeared to be optimal for our current requirements which included prototype quantities of tape product, with a minimum of tooling and development.

Button electrodes 36, 37, such as those shown in FIGS. 8 through 13, may be fabricated in numerous ways, e.g. conventional metal cutting for the prototypes, or powder metallurgy in larger quantity. In either case, the button electrode 36 preferably has a groove 146, into which a lead wire 40 is to be soldered, so that the lead wire 40 will be effectively below the electrode's surface and will not appear as a surface feature.

EXAMPLES

Several self-regulating heaters were made and tested. The electrode surfaces were machined flat and smooth and electrical insulation over those surfaces was extremely thin; approximately 0.002" (0.05 mm), consisting of 0.001" (0.025 mm) polyimide film and 0.001" (0.025 mm) silicone adhesive.

Most of the tests were performed just to see if the heaters, with soldered bonds between the barium titanate PTC material and heavy brass electrodes, would hold up in temperature cycling. They did.

We also then ran a simulated application performance test.

For background, there are certain studs fastened to internal aircraft surfaces in large numbers for the purpose of attaching and supporting wiring harness, hydraulic and pneumatic lines, as well as structural members in some cases. At the base of each such stud is a flange and flat surface of composite material, usually fiberglass reinforced epoxy, for attachment to the aircraft surface by bonding with a high performance epoxy adhesive. The surface to which the stud is bonded is itself generally a composite material. In high performance aircraft, the structural surfaces are often graphite-reinforced epoxy.

The epoxy requires several days to cure at room temperature, which is a burdensome and expensive loss of time in a production or repair operation. Cure time is reduced to one hour if the epoxy bond is held at or above 150° F. (maximum allowable temperature for the structure is about 230° F.). However the studs are generally applied after the aircraft is built, so it is impractical to put the fuselage or another structural section into an autoclave for heating.

The studs are often applied in difficult locations. Heretofore, no satisfactory method to heat the studs for cure had been found. Attempts were made with infrared radiation, hot air blowers, and even conventional heating blankets and tapes. The stud fixture (which holds the stud in place until cured), which blocked any direct heat transfer to the area of interest, plus the lack of room for equipment, and inability to measure the pertinent region's temperature for regulation, prevented reliable cure. Also, graphite fiber in the aircraft surface is an excellent heat conductor, and the amount of heat energy applied by conventional means was not adequate to offset losses by conduction to the surrounding surface.

To overcome these problems, two short sections of heater tape were prepared. Each section was slightly over 2" (50 mm) long and 9/16" (14 mm) wide, and contained three heater buttons. Each button was about 9/16" (14 mm) diameter, and the button centers were ¾" apart. Each button had a maximum heat output capability of about 10 watts. As described above, the insulation on the heater button surfaces was only about 0.002" (0.05 mm) thick. The buttons had a transition temperature (effectively, the regulated maximum temperature) of about 230° F. (110C).

The two tape sections were placed on a graphite epoxy surface, parallel and with about 1" (25 mm) space between them, which is slightly greater than the width of a typical stud attachment flange. The tape sections were held to the surface with polyimide adhesive tape. Power was applied and the apparatus was left for 5 minutes to reach equilibrium.

After 5 minutes, the graphite-epoxy surface temperature between the two heater tape sections was measured with an infrared thermometer (a handheld model from Wahl Instruments). The surface temperature was approximately 170° F. (77 C) in the region between the heater tapes, where the stud attachment flange would be. Therefore the tapes provide a simple, compact, and effective means to heat the stud bases and local mounting surface for rapid cure of the bonding adhesive.

FIG. 11 shows a plan or top view of a heater tape assembly 42 constructed of multiple modules 22 such as the heating button 92 of FIG. 7 undergoing a 45 degree lateral bend.

FIG. 12 shows another plan or top view of a heater tape assembly 42 undergoing a 45 degree lateral bend.

FIG. 13 shows a side view of a heater tape assembly 42 bent in the up-down degree of freedom over (or under) surface contours.

FIG. 14 is an elevation view of another heater whose surface is that of a threaded fastener for heating an article with a mating thread.

FIG. 15 shows a simplified electrical schematic of a heater tape. The heater elements act as resistors in this circuit and are designated by reference number 48.

FIG. 16 shows two short tape sections 190 alongside the bond area 191.

FIG. 17 is an elevation view of another heater with an externally threaded insert 132 mounted on a protrusion 152 from its electrode surface for heating an article having a hole with mating threads 138.

FIG. 18 is an elevation view of another heater with an internally threaded sleeve 102 mounted on a protrusion 152 from its electrode surface for heating an article having a stud with mating threads. FIG. 20 shows a resistance versus temperature graph for the special PTC thermistors used to make the prototypes. The X axis gives Temperature in degrees Centigrade, and the Y axis gives Resistance in Ohms.

It will be understood that each of the elements described above, or two or more together may also find a useful application in other types of devices and methods differing from those types described above.

Alternatives and the Closing

Thus the reader will see that my self-regulating heater supplies a long felt need for a simple, economical, easy to use means for heating a surface. If one should aver that the various embodiments of my self-regulating heater are obvious, then one is hard put to explain why those who currently wish to heat a surface continue to use the background art devices without the advantages of Applicant's invention.

Although the present invention has been described in considerable detail with reference to certain preferred versions thereof, other versions are possible which will be apparent to those who are skilled in the art. While certain novel features of this invention have been shown and described and are pointed out in the annexed claims, it is not intended to be limited to the details above, since it will be understood that various omissions, modifications, substitutions and changes in the forms and details of the embodiments illustrated and in their operation can be made by those skilled in the art without departing in any way from the spirit of the present invention. Therefore, the spirit and scope of the appended claims should not be limited to the description of the preferred embodiments contained herein, but by the appended claims and their legal equivalents.

LIST OF REFERENCE NUMBERS 20 self-regulating heater
22 heater module, bonded assembly
24 surface to be heated
26 ceramic heating element
27 a second ceramic heating element
30 heat transfer region within module
32 total dielectric gap
34 module's heat transfer surface
35 a second heat transfer surface of module
36 electrode of the heater module, high conductivity material
37 a second electrode of the heater module
40 current conductor, bus conductor
42 tape like structure, heat tape assembly
48 element as a resistor
50 upper flat surface of element (used in heater button or tape)
51 lower flat surface of element (used in heater button or tape)
54 element's extended flat upper rectangular surface
55 element's extended flat lower rectangular surface
56 heat flux within module
58 ceramic heater element surface
60 thin layer of dielectric insulation
70 matching contours of module
92 button module
98 stud heater
102 metal sleeve
104 opposing surface of the electrode
108 solder bond
112 deep groove in electrode surface
114 ribs on the electrode surface
116 screen
124 threaded bolt or stud
126 unthreaded hole in the exterior surface of the electrode
132 insert (may be externally threaded)
136 cylindrical outer surface of internally threaded sleeve
138 threads of the surface to be heated
142 threads of the internal hole of the sleeve
144 dielectric insulation
146 clearance groove in electrode surface
152 cylindrical projection or protrusion from electrode surface
154 smooth hole in sleeve
160 heated rod
162 mating hole in surface to be heated
166 hole at one end of the heated rod
170 external surface of the entire module
172 shrink tubing
174 flat internal surface of upper electrode
175 flat internal surface of lower electrode
176 flat exterior surface of electrode
188 rubber skeleton
190 heating tape with 1 or 2 electrodes bonded to each element
191 bond area
196 hole in the skeleton
198 necked down section of rubber skeleton
202 bends in conductors

What is claimed is:

1. A self-regulating heater for heating a surface, said self-regulating heater comprising a heater module having a heat transfer surface, said heater module comprising:
   (a) a ceramic heating element having a positive temperature coefficient electrical resistance;
   (b) two current conductors for supplying electric current to said ceramic heating element;

(c) a heat transfer region containing substantially the entire heat flux between said element and said heat transfer surface;
(d) a total dielectric gap within said region, said total dielectric gap having a total thickness;
wherein the total thickness of said total dielectric gap is less than 0.01 inches over substantially the entire extent of said gap within said region.

2. The self-regulating heater of claim 1, wherein the heat transfer surface of the heater module has contours that substantially match those of the surface to be heated.

3. The self-regulating heater of claim 2, wherein the total thickness of the total dielectric gap is less than 0.006 inches.

4. The self-regulating heater of claim 2, wherein the total thickness of the total dielectric gap is less than 0.003 inches.

5. The self-regulating heater of claim 2, wherein the surface to be heated is cylindrical and threaded, and the heat transfer surface of the heater module is cylindrical with mating threads.

6. The self-regulating heater of claim 5, wherein the heater module further comprises:
(a) a threaded metal insert;
(b) a metal electrode having an exterior surface with a hole or projection thereon; and
(c) a thin dielectric insulating film;
said electrode being bonded to said ceramic heating element, said insert being shrink fit to said hole or projection, and said insert being electrically insulated from said electrode by said dielectric film, such that said threads on said insert constitute said heat transfer surface.

7. The self-regulating heater of claim 6, wherein said hole or projection is a hole in the exterior surface of the electrode, said metal insert is made of aluminum, at room temperature said threaded metal insert is prestressed in compression within said hole, wherein said thin dielectric insulating film is a nonconductive anodize film insulation, said anodize film enwrapping the outer surface of the threaded metal insert, said insulation being less than 0.0004 inches thick, said insulation electrically insulating the threaded insert from the electrode, whereby the film is completely protected from mechanical damage, provides strong electrical insulation between the electrode and the threaded insert, and offers negligible resistance to heat transfer.

8. The self-regulating heater of claim 7 further comprising heat shrink tubing for externally insulating the heater.

9. The self-regulating heater of claim 6, wherein the means for bonding is solder, whereby a solder bond is formed.

10. The self-regulating heater of claim 9, wherein the electrode surface that is conductively bonded to the heating element with solder has grooves, such that the electrode material between adjacent grooves constitutes ribs, each of said ribs having a thickness between the grooves on either side of it, said thickness being the distance between the grooves, such that the grooves are deep relative to the thickness of said ribs.

11. The self-regulating heater of claim 9, wherein the solder bond includes copper screen embedded and bonded into the solder between said electrode surface and said heating element.

12. The self-regulating heater of claim 9, wherein the electrode of the heater module is pre-stressed in tension and the ceramic heating element of the heater module is pre-stressed in compression at room temperature.

13. The self-regulating heater of claim 2, wherein the heater module further comprises a metal electrode conductively bonded to said ceramic heating element, said metal electrode having a surface with contours that substantially match those of the surface to be heated, said contoured electrode surface having a dielectric insulation applied thereto and having adequate smoothness so that said dielectric insulation applied over said contoured surface to form said heat transfer surface can be substantially constant in thickness.

14. The self-regulating heater of claim 13 wherein the area of the contoured surface of the electrode is substantially greater than the area of its bond to the ceramic heating element.

15. The self-regulating heater of claim 13, wherein the means for conductively bonding is solder, whereby a solder bond is formed.

16. The self-regulating heater of claim 15, wherein the electrode surface that is conductively bonded to the heating element with solder has grooves, such that the electrode material between adjacent grooves constitutes ribs, each of said ribs having a thickness between the grooves on either side of it, said thickness being the distance between the grooves, such that the grooves are deep relative to the thickness of said ribs.

17. The self-regulating heater of claim 15, wherein the solder bond includes copper screen embedded and bonded into the solder between said electrode surface and said heating element.

18. The self-regulating heater of claim 15, wherein the electrode of the heater module is pre-stressed in tension and the ceramic heating element of the heater module is pre-stressed in compression at room temperature.

19. The self-regulating heater of claim 15, wherein:
(a) the heat transfer surface of the heater module is flat, whereby surfaces which are flat or have mild contours can be efficiently heated;
(b) the ceramic heating element of the heater module is substantially flat; and
(c) the surface area of the heat transfer surface of the dielectric insulation applied to the electrode is substantially greater than the surface area of the ceramic heating element to which the electrode is bonded.

20. The self-regulating heater of claim 19, wherein the total thickness of the total dielectric gap is less than 0.003 inches.

21. The self-regulating heater of claim 20, wherein said dielectric gap includes a polyimide film bonded to the flat electrode surface with silicone adhesive to form an electrically insulated, flat heat transfer surface.

22. The self-regulating heater of claim 20, wherein the dielectric gap includes a high temperature coating film applied as a liquid and cured in place at low temperature with ultraviolet radiation.

23. The self-regulating heater of claim 20, wherein the dielectric gap includes a halocarbon coating applied as powder.

24. The self-regulating heater of claim 20 further comprising at least one additional heater module, each of said heater modules having at least one substantially flat heat transfer surface, wherein said two current conductors further comprise two bus conductors along which the at least one additional heater module is electrically connected in parallel and mechanically connected in series, whereby a heater tape is formed, the sections of bus conductors between adjacent heater modules being bowed to permit structural flexibility in at least the side-to-side and up-and-down degrees of freedom.

25. The self-regulating heater of claim 24 further comprising a flexible, insulating structural skeleton, so disposed as to surround each ceramic heating element while not interfering with the contact of each heat transfer surface against a surface being heated, said skeleton being reduced to a narrow neck in the region between adjacent heater modules, whereby there is formed a structurally stable heater tape, and whereby the skeleton and bus conductors between the multiple heater modules are shaped and comprised to permit bending in two degrees of freedom.

26. The self-regulating heater of claim 25, wherein the skeleton is comprised of a strip of heat resistant rubber and the necked-down section of the rubber skeleton is sufficiently narrow and sufficiently flexible, and sufficiently long relative to the dimensions of individual modules, so that at least 90 degrees up-and-down bending and at least 45 degrees side-to-side bending is permitted at the skeleton's narrow neck.

27. The self-regulating heater of claim 20 wherein the number of electrodes of the heater module is two and wherein:

(a) the ceramic heating element has a substantially flat upper surface and a substantially flat lower surface, said surfaces being substantially parallel to one another;

(b) one of the metal electrodes, designated the upper electrode, has a flat external surface and an inner surface which is conductively bonded to the upper surface of the ceramic heating element;

(c) another of the metal electrodes, designated the lower electrode, has a flat external surface and an inner surface which is conductively bonded to the lower surface of the ceramic heating element;

and wherein the dielectric insulation on the external surfaces of both electrodes is less than 0.003 inches thick;

whereby a symmetrical heater module is formed with a ceramic heating element sandwiched between two metal electrodes, having both upper and lower heat transfer surfaces.

28. The self-regulating heater of claim 27 further comprising at least one additional heater module, each of said heater modules having two substantially flat heat transfer surfaces, wherein said two current conductors further comprise two bus conductors along which the at least one additional heater module is electrically connected in parallel and mechanically connected in series, whereby a heater tape is formed, the sections of bus conductors between adjacent heater modules being bowed to permit structural flexibility in at least the side-to-side and up-and-down degrees of freedom.

29. The self-regulating heater of claim 28 further comprising a flexible, insulating structural skeleton, so disposed as to surround each ceramic heating element while not interfering with the contact of each heat transfer surface against a surface being heated, said skeleton being reduced to a narrow neck in the region between adjacent heater modules, whereby there is formed a structurally stable heater tape, and whereby the skeleton and bus conductors between the multiple heater modules are shaped and comprised to permit bending in two degrees of freedom.

30. The self-regulating heater of claim 29, wherein the skeleton is comprised of a strip of heat resistant rubber and the necked-down section of the rubber skeleton is sufficiently narrow and sufficiently flexible, and sufficiently long relative to the dimensions of individual modules, so that at least 90 degrees up-and-down bending and at least 45 degrees side-to-side bending is permitted at the skeleton's narrow neck.

31. The self-regulating heater of claim 1 further comprising at least one additional heater module, each of said heater modules having at least one substantially flat heat transfer surface, wherein said two current conductors further comprise two bus conductors along which the at least one additional heater module is electrically connected in parallel and mechanically connected in series, whereby a heater tape is formed, the sections of bus conductors between adjacent heater modules being bowed to permit structural flexibility in at least the side-to-side and up-and-down degrees of freedom.

32. The self-regulating heater of claim 31 further comprising a flexible, insulating structural skeleton, so disposed as to surround each ceramic heating element while not interfering with the contact of each heat transfer surface against a surface being heated, said skeleton being reduced to a narrow neck in the region between adjacent heater modules, whereby there is formed a structurally stable heater tape, and whereby the skeleton and bus conductors between the multiple heater modules are shaped and comprised to permit bending in two degrees of freedom.

33. The self-regulating heater of claim 32, wherein the skeleton is comprised of a strip of heat resistant rubber and the necked-down section of the rubber skeleton is sufficiently narrow and sufficiently flexible, and sufficiently long relative to the dimensions of individual modules, so that at least 90 degrees up-and-down bending and at least 45 degrees side-to-side bending is permitted at the skeleton's narrow neck.

34. The self-regulating heater of claim 31 wherein said bus conductors are cords of graphite fiber.

\* \* \* \* \*

UNITED STATES PATENT AND TRADEMARK OFFICE
CERTIFICATE OF CORRECTION

PATENT NO. : 6,350,969 B1
DATED : February 26, 2002
INVENTOR(S) : Ronald D. Rothchild It is certified that error appears in the above-identified patent and that said Letters Patent is hereby corrected as shown below:

Column 4,
Line 54, replace "over 10,000 Ω1 and power" with -- over 10,000 Ω, and power --.

Column 5,
Lines 59-61, replace "approximately 0.125 in (80 mm) (area of the element) to 0.25 in (160 mm)" with -- approximately 0.125 in$^2$ (80 mm$^2$) (area of the element) to 0.25 in$^2$ (160 mm$^2$) --.

Column 24,
Line 29, replace "104 opposing surface of the electrode" with -- 106 opposing surface of the electrode --.

Signed and Sealed this

Seventeenth Day of September, 2002

*Attest:*

JAMES E. ROGAN
*Director of the United States Patent and Trademark Office*

*Attesting Officer*